(12) United States Patent
Tenno et al.

(10) Patent No.: US 10,445,635 B2
(45) Date of Patent: Oct. 15, 2019

(54) FEEDER COIL, ANTENNA DEVICE, AND ELECTRONIC APPLIANCE

(71) Applicant: Murata Manufacturing Co., Ltd., Nagaokakyo-shi, Kyoto-fu (JP)

(72) Inventors: Nobuyuki Tenno, Nagaokakyo (JP); Hiromitsu Ito, Nagaokakyo (JP); Kentaro Mikawa, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/844,663

(22) Filed: Dec. 18, 2017

(65) Prior Publication Data

US 2018/0121781 A1    May 3, 2018

Related U.S. Application Data

(63) Continuation of application No. PCT/JP2016/071487, filed on Jul. 22, 2016.

(30) Foreign Application Priority Data

Jul. 31, 2015 (JP) ................................. 2015-151742
Oct. 8, 2015 (JP) ................................. 2015-199885

(51) Int. Cl.
*H01Q 7/08* (2006.01)
*G06K 19/077* (2006.01)
(Continued)

(52) U.S. Cl.
CPC ... *G06K 19/07773* (2013.01); *G06K 7/10316* (2013.01); *G06K 7/10336* (2013.01);
(Continued)

(58) Field of Classification Search
None
See application file for complete search history.

(56) References Cited

U.S. PATENT DOCUMENTS 9,543,642 B2 *  1/2017  Kato ........................ H01Q 1/38
9,627,762 B2 *  4/2017  Ito ............................ H01Q 1/38
(Continued)

FOREIGN PATENT DOCUMENTS

JP    2008-197714 A    8/2008
JP    2011-211611 A    10/2011
(Continued)

OTHER PUBLICATIONS

Official Communication issued in International Patent Application No. PCT/JP2016/071487, dated Oct. 11, 2016.

*Primary Examiner* — Trinh V Dinh
(74) *Attorney, Agent, or Firm* — Keating & Bennett, LLP

(57) ABSTRACT

An antenna device includes first and second coil antennas with winding axis directions that are not perpendicular to each other, and a feeder coil including a winding axis that extends perpendicular or substantially perpendicular to the winding axis of the first coil antenna. The feeder coil is located between the first coil antenna and the second coil antenna in a height direction (winding axis direction) thereof. A first coil aperture is closer to a coil aperture of the first coil antenna than a second coil aperture. The second coil aperture is closer to a coil aperture of the second coil antenna than the first coil aperture. The first and second coil antennas are connected to each other in a polarity such that magnetic fluxes thereof with respect to the winding axis direction of the first coil antenna are in phase with each other.

9 Claims, 28 Drawing Sheets

(51) Int. Cl.
  *H01Q 7/06*   (2006.01)
  *G06K 7/10*   (2006.01)
  *H01Q 7/00*   (2006.01)

(52) U.S. Cl.
  CPC ..... *G06K 7/10346* (2013.01); *G06K 7/10356* (2013.01); *G06K 19/07749* (2013.01); *H01Q 7/00* (2013.01); *H01Q 7/06* (2013.01)

(56) References Cited

U.S. PATENT DOCUMENTS

| | | | |
|---|---|---|---|
| 9,812,764 B2 * | 11/2017 | Kato | H01Q 1/38 |
| 2007/0051807 A1 | 3/2007 | Yamaguchi | |
| 2013/0307746 A1 * | 11/2013 | Nakano | H01Q 1/2225 |
| | | | 343/850 |
| 2014/0176382 A1 | 6/2014 | Nakano et al. | |
| 2014/0203981 A1 | 7/2014 | Nakano et al. | |
| 2015/0116168 A1 | 4/2015 | Yosui | |
| 2016/0262006 A1 * | 9/2016 | Keller | H04W 8/10 |
| 2016/0352016 A1 * | 12/2016 | Ito | H01Q 7/00 |
| 2017/0194711 A1 * | 7/2017 | Nakano | H01Q 7/00 |
| 2018/0114042 A1 * | 4/2018 | Tenno | H01Q 7/06 |
| 2018/0121781 A1 * | 5/2018 | Tenno | H01Q 7/06 |

FOREIGN PATENT DOCUMENTS

| | | |
|---|---|---|
| JP | 2012-161062 A | 8/2012 |
| JP | 2013-141164 A | 7/2013 |
| JP | 5532191 B1 | 6/2014 |
| JP | 2014-239539 A | 12/2014 |
| WO | 2005017821 A1 | 2/2005 |
| WO | 2012/173080 A1 | 12/2012 |
| WO | 2014/003163 A1 | 1/2014 |

* cited by examiner

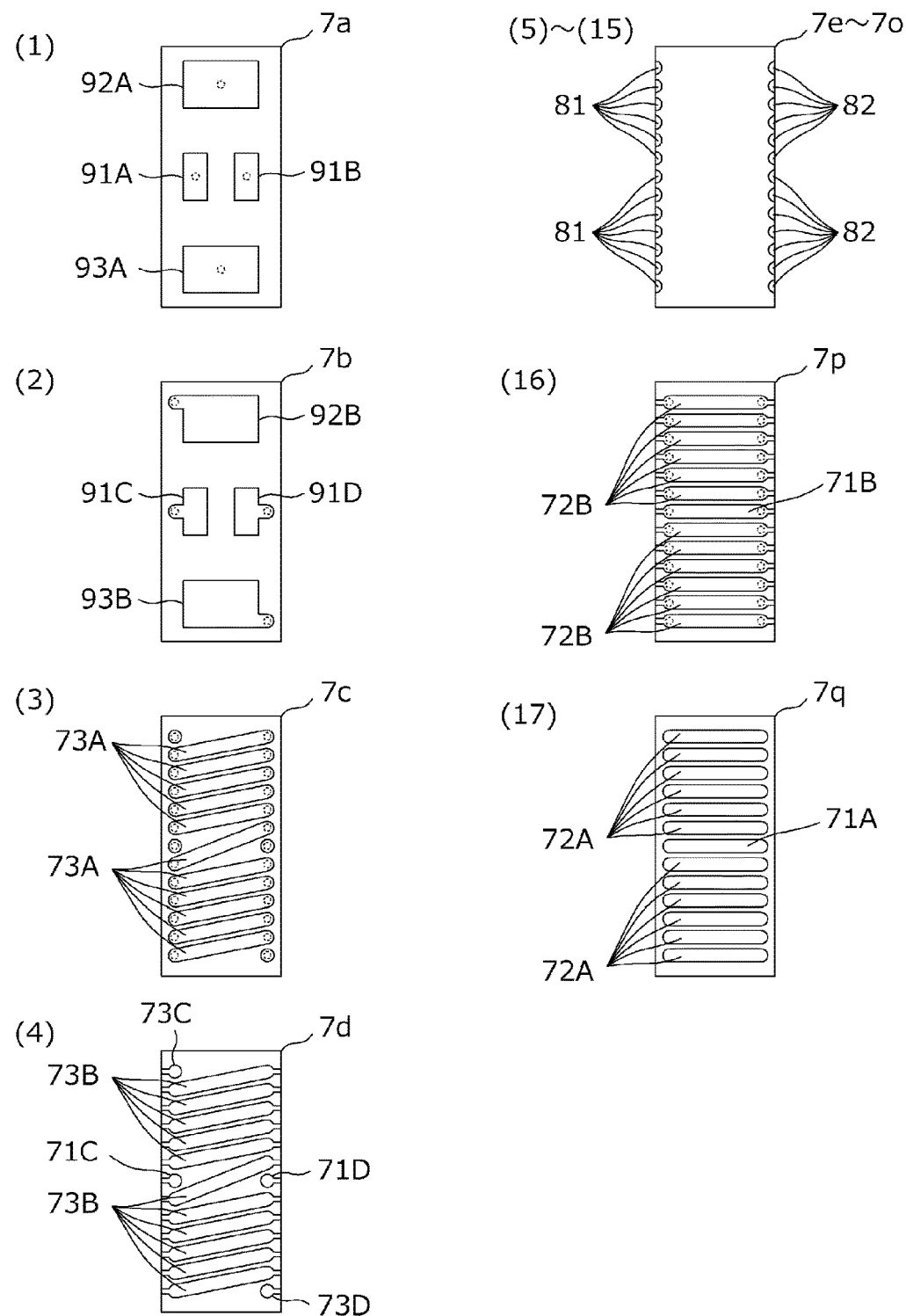

FEEDER COIL, ANTENNA DEVICE, AND ELECTRONIC APPLIANCE

CROSS REFERENCE TO RELATED APPLICATIONS

This application claims the benefit of priority to Japanese Patent Application No. 2015-199885 filed on Oct. 8, 2015 and Japanese Patent Application No. 2015-151742 filed on Jul. 31, 2015 and is a Continuation Application of PCT Application No. PCT/JP2016/071487 filed on Jul. 22, 2016. The entire contents of each application are hereby incorporated herein by reference.

BACKGROUND OF THE INVENTION

1. Field of the Invention

The present invention relates to an antenna device preferably for use in communication such as, near-field communication (NFC), and also relates to an electronic appliance including the antenna device, and to a feeder coil included in the antenna device.

2. Description of the Related Art

International Publication No. 2005/017821 discloses an antenna device that includes a feeder coil that is connected to a transmission/reception circuit, and a coil antenna that is magnetic-field coupled with the feeder coil. When a feeder coil that is magnetic-field coupled with a coil antenna is provided in this manner, it is not necessary for the transmission/reception circuit to be directly connected to the coil antenna, it is not necessary to solder, for example, signal cables and connection connectors, the assembly workload can be reduced, it is not necessary to secure space in which to route signal cables, and size reduction of an antenna device and an electronic appliance is facilitated.

Reductions in the size of electronic appliances that include an antenna device used in communication such as NFC are demanded, but there are many constraints on the shape and the number of turns of coils, and it may not be possible to realize adequate coupling with the antenna device of a communication partner with only one coil antenna of a limited size.

On the other hand, if the coupling coefficient between the feeder coil and the coil antenna is not suitably realized in an antenna device that includes a feeder coil and a coil antenna such as in the example disclosed in International Publication No. 2005/017821, coupling between the antenna device and the antenna device of the communication partner may be weakened. Furthermore, the degree of freedom of design when making a feeder coil and a coil antenna couple with each other with a prescribed coupling coefficient while forming a coil antenna of a prescribed inductance is low.

SUMMARY OF THE INVENTION

Preferred embodiments of the present invention provide feeder coils, antenna devices in which a coupling state between a feeder coil and a coil antenna is able to be appropriately established, and electronic appliances that each include an antenna device.

An antenna device according to a preferred embodiment of the present invention includes a first coil antenna and a second coil antenna, winding axis directions of which are not perpendicular to each other; and a feeder coil including a winding axis that extends in a direction perpendicular or substantially perpendicular to the winding axis of the first coil antenna, including a first coil aperture and a second coil aperture, and being located between the first coil antenna and the second coil antenna in a height direction (winding axis direction) thereof.

The first coil aperture is closer to a coil aperture of the first coil antenna than the second coil aperture in a plan view along the winding axis direction of the first coil antenna.

The second coil aperture is closer to a coil aperture of the second coil antenna than the first coil aperture in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, the magnetic fluxes that pass through the first coil antenna and the second coil antenna (radiate from or are incident to) flow in the same or substantially the same direction through the feeder coil without obstructing each other, and therefore excellent communication characteristics are able to be provided. In other words, the feeder coil is strongly coupled with both the first coil antenna and the second coil antenna, and as a result, the first coil antenna and the second coil antenna define and function as highly efficient radiating bodies.

In a preferred embodiment of the present invention, it is preferable that the first coil antenna includes a modified-shape portion in which the first coil antenna extends in a direction from the second coil aperture toward the first coil aperture in a plan view along the winding axis direction of the first coil antenna. Thus, the surface area in plan view is able to be smaller and a small-size antenna device is able to be provided. In addition, by stacking the first coil antenna and the second coil antenna on top of one another, the first coil antenna and the second coil antenna couple with each other and strengthen each other's inductances, and therefore the efficiencies of the coil antennas as radiating bodies are increased.

In a preferred embodiment of the present invention, it is preferable that the second coil antenna includes a modified-shape portion in which the second coil antenna extends in a direction from the first coil aperture toward the second coil aperture in a plan view along the winding axis direction of the second coil antenna. Therefore, not only is the coupling between the feeder coil and the first coil antenna able to be increased, but also the coupling between the feeder coil and the second coil antenna is able to be increased.

An antenna device according to a preferred embodiment of the present invention includes a first coil antenna and a second coil antenna, winding axis directions of which are not perpendicular to each other; and a feeder coil including a winding axis that extends in a direction perpendicular or substantially perpendicular to the winding axis of the first coil antenna, including a first coil aperture and a second coil aperture, and being located between the first coil antenna and the second coil antenna.

The first coil aperture is closer to a coil aperture of the first coil antenna than the second coil aperture in a plan view along the winding axis direction of the first coil antenna.

A region in which the feeder coil is provided is superposed with at least a portion of a coil conductor of the second coil antenna, and the first coil aperture and the second coil aperture are positioned outside a coil aperture of the second coil antenna or the first coil aperture and the second coil aperture are superposed with the coil aperture of the second coil antenna in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, coupling between the feeder coil and the second coil antenna is able to be significantly reduced or prevented while allowing the feeder coil and the first coil antenna to couple with each other.

In a preferred embodiment of the present invention, it is preferable that the first coil antenna includes a modified-shape portion in which the first coil antenna extends in a direction from the second coil aperture toward the first coil aperture in a plan view along the winding axis direction of the first coil antenna. Thus, the surface area in plan view is able to be smaller and a small-size antenna device is able to be provided. In addition, by stacking the first coil antenna and the second coil antenna on top of one another, the first coil antenna and the second coil antenna couple with each other and strengthen each other's inductances, and therefore the efficiencies of the coil antennas as radiating bodies are increased.

In a preferred embodiment of the present invention, it is preferable that the first coil antenna includes a greater number of turns than the second coil antenna. Thus, the coupling coefficient between the feeder coil and the first coil antenna is able to be increased while significantly reducing or preventing coupling between the feeder coil and the second coil antenna.

In a preferred embodiment of the present invention, it is preferable that at least either of the first coil antenna and the second coil antenna define at least a portion of a radiating element that radiates electromagnetic waves in a far field, and that the first coil antenna and the second coil antenna define at least a portion of a radiating element that radiates a magnetic field. Accordingly, a small-size antenna device is able to be provided that includes both a near-field antenna and a far-field antenna.

In a preferred embodiment of the present invention, it is preferable that at least either of the first coil antenna and the second coil antenna define at least a portion of a radiating element that radiates electromagnetic waves a short distance, and that the second coil antenna define at least a portion of a radiating element of a standing wave antenna. Accordingly, a small-size antenna device is able to be provided that includes a standing wave antenna that is suitable for long-range communication and an antenna that is applied to short-range communication.

In a preferred embodiment of the present invention, it is preferable that a region in which the first coil antenna and the coil aperture of the first coil antenna are provided and a region in which the second coil antenna and the coil aperture of the second coil antenna are formed be at least partially superposed with each other in a plan view along the winding axis direction of the first coil antenna or the winding axis direction of the second coil antenna. Thus, the surface area in plan view is able to be smaller and a small-size antenna device is able to be provided.

In a preferred embodiment of the present invention, it is preferable that a portion of the first coil antenna or a portion of the second coil antenna be included in the feeder coil. Accordingly, the first coil antenna (or the second coil antenna) and a coil conductor of the feeder coil are closer to each other than in the case where the portion of the first coil antenna or the portion of the second coil antenna is not included in the feeder coil. In other words, the distance between the first coil antenna (or the second coil antenna) and the coil conductor becomes shorter. Therefore, coupling between the first coil antenna (or the second coil antenna) and the coil conductor is able to be stronger.

An antenna device according to a preferred embodiment of the present invention includes a first coil antenna and a second coil antenna, winding axis directions of which are not perpendicular to each other; and a feeder coil including a winding axis that extends in a direction perpendicular or substantially perpendicular to the winding axis of the first coil antenna, including a first coil aperture and a second coil aperture, and being located between the first coil antenna and the second coil antenna.

A region in which a coil aperture of the first coil antenna is provided and a region in which a coil aperture of the second coil antenna is provided are at least partially superposed with each other in a plan view along the winding axis direction of the first coil antenna.

The first coil aperture is closer to the first coil antenna than to the second coil antenna in the winding axis direction of the first coil antenna, and the first coil aperture is closer to the coil aperture of the first coil antenna than the second coil aperture in a plan view along the winding axis direction of the first coil antenna.

The first coil antenna and the second coil antenna are connected to each other in a polarity such that magnetic fluxes thereof with respect to the winding axis direction of the first coil antenna are in phase with each other.

An antenna device according to a preferred embodiment of the present invention includes a first coil antenna and a second coil antenna, winding axis directions of which are not perpendicular to each other; and a feeder coil including a winding axis that extends in a direction perpendicular or substantially perpendicular to the winding axis of the first coil antenna, including a first coil aperture and a second coil aperture, and being located between the first coil antenna and the second coil antenna.

A region in which a coil aperture of the first coil antenna is provided and a region in which a coil aperture of the second coil antenna is provided are at least partially superposed with each other in a plan view along the winding axis direction of the first coil antenna.

The feeder coil is closer to the first coil antenna than to the second coil antenna in the winding axis direction of the first coil antenna.

The first coil aperture is closer to the coil aperture of the first coil antenna than the second coil aperture in a plan view along the winding axis direction of the first coil antenna.

A region in which the feeder coil is provided is superposed with at least a portion of a coil conductor of the second coil antenna, and the first coil aperture and the second coil aperture are positioned outside the coil aperture of the second coil antenna or the first coil aperture and the second coil aperture are superposed with the coil aperture of the second coil antenna in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, coupling between the feeder coil and the second coil antenna is able to be significantly reduced or prevented while allowing the feeder coil and the first coil antenna to couple with each other. In addition, by stacking the first coil antenna and the second coil antenna on top of one another, the first coil antenna and the second coil antenna couple with each other and strengthen each other's inductances, and therefore the efficiencies of the coil antennas as radiating bodies are increased.

In a preferred embodiment of the present invention, it is preferable that the first coil antenna includes a modified-shape portion in which the first coil antenna extends in a direction from the second coil aperture toward the first coil aperture in a plan view along the winding axis direction of the first coil antenna. Thus, the surface area in plan view is able to be smaller and a small-size antenna device is able to be provided.

In a preferred embodiment of the present invention, it is preferable that the first coil antenna includes a greater number of turns than the second coil antenna. Thus, the coupling between the feeder coil and the first coil antenna is able to be increased while significantly reducing or preventing coupling between the feeder coil and the second coil antenna.

In a preferred embodiment of the present invention, it is preferable that at least either of the first coil antenna and the second coil antenna define at least a portion of a radiating element that radiates electromagnetic waves in a far field, and that the first coil antenna and the second coil antenna define at least a portion of a radiating element that radiates a magnetic field in a near field. Accordingly, a small-size antenna device is able to be provided that includes both a near-field antenna and a far-field antenna.

In a preferred embodiment of the present invention, it is preferable that at least either of the first coil antenna and the second coil antenna define at least a portion of a radiating element of a standing wave antenna. Accordingly, a small-size antenna device is able to be provided that includes a standing wave antenna that is suitable for long-range communication and an antenna that is applied to short-range communication.

In a preferred embodiment of the present invention, it is preferable that a portion of the first coil antenna or a portion of the second coil antenna be included in the feeder coil. Accordingly, the first coil antenna (or the second coil antenna) and a coil conductor of the feeder coil are closer to each other than in the case where the portion of the first coil antenna or the portion of the second coil antenna is not provided in the feeder coil. In other words, the distance between the first coil antenna (or the second coil antenna) and the coil conductor becomes shorter, and the coupling between the first coil antenna (or the second coil antenna) and the coil conductor is able to be stronger.

An antenna device according to a preferred embodiment of the present invention includes a first coil antenna conductor including a winding axis; and a feeder coil. The feeder coil includes a multilayer body including magnetic layers, a coil conductor that is included in the multilayer body and that includes a winding axis that extends in a direction perpendicular or substantially perpendicular to the winding axis of the first coil antenna conductor, and a first loop conductor that is included in the multilayer body, includes a winding axis that extends in a direction perpendicular or substantially perpendicular to the winding axis of the first coil antenna conductor, and is not electrically connected to the coil conductor.

The winding axis of the first loop conductor and the winding axis of the coil conductor match or substantially match each other.

At least a portion of an aperture of the first loop conductor is superposed with an aperture of the coil conductor when viewed in the winding axis direction of the coil conductor.

A number of turns of the first loop conductor is substantially one, or the first loop conductor includes an inductance that is less than or equal to about $1/10$ an inductance of the coil conductor.

The first coil antenna conductor and the first loop conductor are connected to each other and define a single coil antenna.

Accordingly, the coil antenna and the coil conductor of the feeder coil are closer to each other than in the case where the first loop conductor, which is a portion of the coil antenna, is not included in the feeder coil. In other words, the distance between the coil antenna and the coil conductor becomes shorter, and the coupling between the coil antenna and the coil conductor is able to be stronger.

In a preferred embodiment of the present invention, an antenna device may include a plurality of connection terminals provided on a bottom surface of the multilayer body.

The plurality of connection terminals may include two outer connection terminals that are respectively electrically connected to two ends of the coil conductor, and two first coil antenna conductor connection terminals that are respectively electrically connected to two ends of the first loop conductor.

It is preferable that a direction of a current that flows through the first loop conductor close to a top surface of the multilayer body that faces the bottom surface be opposite to a direction of a current that flows to the first coil antenna conductor connection terminal from the first coil antenna conductor when viewed in a winding axis direction of the first loop conductor. Accordingly, magnetic flux generated by the first loop conductor is not canceled out by magnetic flux generated by the first coil antenna conductor, and therefore the efficiency of the coil antenna as a radiating body is increased.

A feeder coil according to a preferred embodiment of the present invention includes a multilayer body including magnetic layers; a coil conductor that is connected to an external feeder circuit, is included in the multilayer body, and includes a winding axis; and a first loop conductor that is included in the multilayer body, includes a winding axis, and is not electrically connected to the coil conductor.

The winding axis of the first loop conductor and the winding axis of the coil conductor match or substantially match each other.

At least a portion of an aperture of the first loop conductor is superposed with an aperture of the coil conductor when viewed in the winding axis direction of the coil conductor.

A number of turns of the first loop conductor is substantially one, or the first loop conductor includes an inductance that is less than or equal to about $1/10$ an inductance of the coil conductor.

Accordingly, the distance between the first loop conductor and the coil conductor is short, and therefore a feeder coil is able to be provided with which there is strong coupling between the coil antenna and the coil conductor.

The feeder coil may include a plurality of connection terminals provided on a bottom surface of the multilayer body.

The plurality of connection terminals may include two outer connection terminals that are respectively electrically connected to two ends of the coil conductor, and two first coil antenna conductor connection terminals that are respectively electrically connected to two ends of the first loop conductor.

An electronic appliance according to a preferred embodiment of the present invention includes a casing and an antenna device.

The antenna device includes a first coil antenna and second coil antenna, winding axis directions of which are not perpendicular to each other, and a feeder coil including a winding axis that extends in a direction perpendicular or substantially perpendicular to the winding axis of the first coil antenna, including a first coil aperture and a second coil aperture, and being located between the first coil antenna and the second coil antenna in a height direction (winding axis direction) thereof.

The first coil aperture is closer to a coil aperture of the first coil antenna than the second coil aperture in a plan view along the winding axis direction of the first coil antenna.

The second coil aperture is closer to a coil aperture of the second coil antenna than the first coil aperture in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, an electronic appliance is provided that includes an antenna device in which a coupling state between a feeder coil and a coil antenna is appropriately established.

An electronic appliance according to a preferred embodiment of the present invention includes a casing and an antenna device. The antenna device includes a first coil antenna and second coil antenna, winding axis directions of which are not perpendicular to each other, and a feeder coil including a winding axis that extends in a direction perpendicular or substantially perpendicular to the winding axis of the first coil antenna, including a first coil aperture and a second coil aperture, and being located between the first coil antenna and the second coil antenna.

The first coil aperture is closer to a coil aperture of the first coil antenna than the second coil aperture in a plan view along the winding axis direction of the first coil antenna.

A region in which the feeder coil is provided is superposed with at least a portion of a coil conductor of the second coil antenna, and the first coil aperture and the second coil aperture are positioned outside a coil aperture of the second coil antenna or the first coil aperture and the second coil aperture are superposed with the coil aperture of the second coil antenna in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, an electronic appliance is provided that includes an antenna device in which a coupling state between a feeder coil and a coil antenna is appropriately established.

An electronic appliance according to a preferred embodiment of the present invention includes a casing and an antenna device. The antenna device includes a first coil antenna and second coil antenna, winding axis directions of which are not perpendicular to each other, and a feeder coil including a winding axis that extends in a direction perpendicular or substantially perpendicular to the winding axis of the first coil antenna, including a first coil aperture and a second coil aperture, and being located between the first coil antenna and the second coil antenna.

A region in which a coil aperture of the first coil antenna is provided and a region in which a coil aperture of the second coil antenna is provided are at least partially superposed with each other in a plan view along the winding axis direction of the first coil antenna.

The first coil aperture is closer to the coil aperture of the first coil antenna than the second coil aperture in a plan view along the winding axis direction of the first coil antenna, and the first coil aperture is closer to the first coil antenna than the second coil antenna in the winding axis direction of the first coil antenna.

The first coil antenna and the second coil antenna are connected to each other in a polarity such that magnetic fluxes thereof with respect to the winding axis direction of the first coil antenna are in phase with each other.

An electronic appliance according to a preferred embodiment of the present invention includes a casing and an antenna device. The antenna device includes a first coil antenna and second coil antenna, winding axis directions of which are not perpendicular to each other, and a feeder coil including a winding axis that extends in a direction perpendicular or substantially perpendicular to the winding axis of the first coil antenna, including a first coil aperture and a second coil aperture, and being located between the first coil antenna and the second coil antenna.

A region in which a coil aperture of the first coil antenna is provided and a region in which a coil aperture of the second coil antenna is provided are at least partially superposed with each other in a plan view along the winding axis direction of the first coil antenna.

The feeder coil is closer to the first coil antenna than to the second coil antenna in the winding axis direction of the first coil antenna.

The first coil aperture is closer to the coil aperture of the first coil antenna than the second coil aperture in a plan view along the winding axis direction of the first coil antenna.

A region in which the feeder coil is provided is superposed with at least a portion of a coil conductor of the second coil antenna, and the first coil aperture and the second coil aperture are positioned outside the coil aperture of the second coil antenna or the first coil aperture and the second coil aperture are superposed with the coil aperture of the second coil antenna in a plan view along the winding axis direction of the second coil antenna.

The first coil antenna and the second coil antenna are connected to each other in a polarity such that magnetic fluxes thereof with respect to the winding axis direction of the first coil antenna are in phase with each other.

Accordingly, an electronic appliance is provided that includes an antenna device in which a coupling state between a feeder coil and a coil antenna is appropriately established.

At least one out of the first coil antenna and the second coil antenna preferably includes at least a portion of a conductive portion defined by a casing. Thus, a small-size electronic appliance is able to include a reduced number of components.

According to preferred embodiments of the present invention, feeder coils, antenna devices in which a coupling state between a feeder coil and a coil antenna is appropriately established, and electronic appliances that each include an antenna device are provided.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 18 is an exploded plan view illustrating electrode patterns and the like of individual substrate layers of a multilayer body 70 of the feeder coil shown in FIG. 17.

DETAILED DESCRIPTION OF THE PREFERRED EMBODIMENTS

Figure 1A:
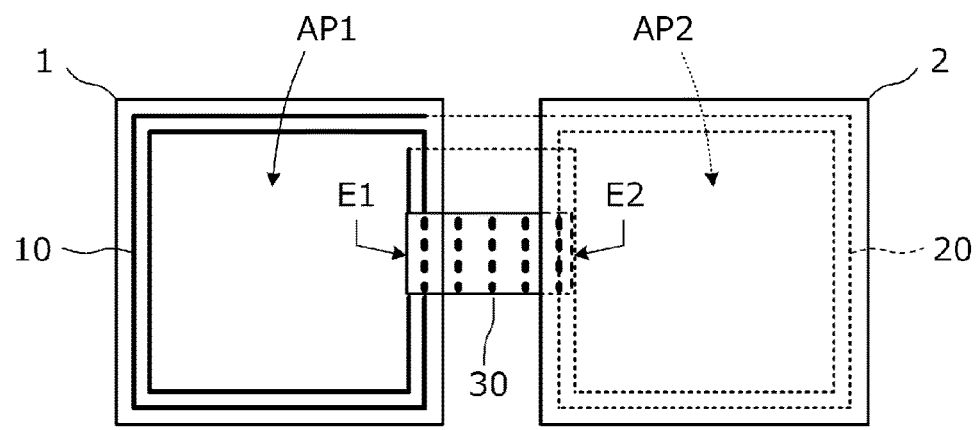
FIG. 1A is a plan view of an antenna device 101 according to a first preferred embodiment of the present invention.

In each of the preferred embodiments described hereafter, the term "antenna device" refers to an antenna that mainly radiates magnetic flux unless otherwise indicated. An antenna device is an antenna that preferably performs near-field communication in which magnetic field coupling with the antenna of a communication partner is utilized. The antenna device is applied to near-field communication (NFC), for example. The frequency band in which the antenna device operates is a HF band, for example, and the antenna device is particularly operated at 13.56 MHz or frequencies in a vicinity of 13.56 MHz. The antenna device is considerably smaller than the wavelength λ at the operation frequency, and therefore the radiation characteristics of electromagnetic waves in the operation frequency band are poor. The length of a coil conductor of a coil antenna of the antenna device, which is described later, when the coil conductor has been stretched out is less than or equal to about λ/10. In this case, the term "wavelength" refers to the effective wavelength taking into consideration a wavelength shortening effect due to a dielectric property and magnetic permeability of a substrate on which the antenna is provided. The two ends of the coil conductor of the coil antenna are connected to a feeder circuit that operates in the operation frequency band (HF band, in particular, in a vicinity of 13.56 MHz). Therefore, a current of a uniform size or substantially uniform size flows along the coil conductor, that is, in the direction of current flow, and a current distribution is unlikely to be generated along the coil conductor unlike in the case where the length of the coil conductor is similar to or greater than the wavelength.

Hereafter, preferred embodiments of the present invention will be described by providing a number of specific examples while referring to the drawings. Identical components and elements are denoted by identical symbols in the drawings. Taking explanation of important points or ease of understanding into account, the preferred embodiments are separately described for the sake of convenience, but components and elements of the different preferred embodiments may be substituted for one another or combined with each other. In the second preferred embodiment and preferred embodiments thereafter, description of matters common to the first preferred embodiment is omitted and only the differences are described. In particular, the same or similar operational effects resulting from the same or similar components and elements are not repeatedly described in the individual preferred embodiments.

First Preferred Embodiment

In a first preferred embodiment of the present invention, an example of an antenna device is described in which a feeder coil is coupled with both a first coil antenna and a second coil antenna.

Figure 1B:
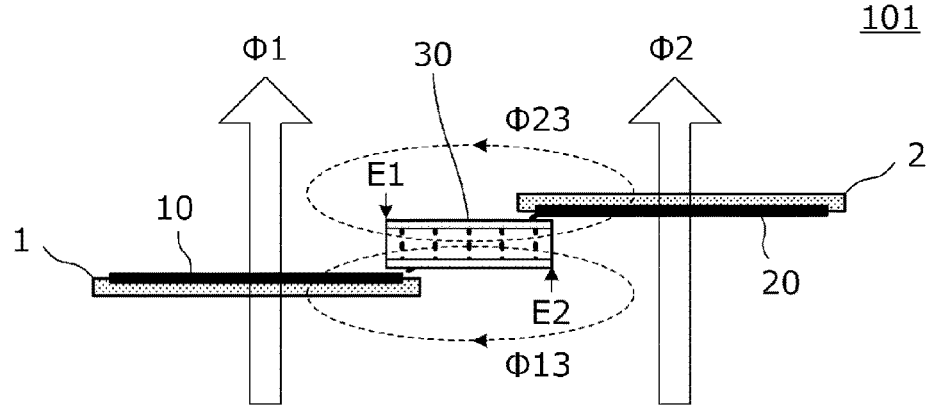
FIG. 1B is a front view of the antenna device 101.

FIG. 1A is a plan view of an antenna device 101 according to the first preferred embodiment, and FIG. 1B is a front view of the antenna device 101.

The antenna device 101 includes a first coil antenna 10, a second coil antenna 20, and a feeder coil 30. The first coil antenna 10 is a rectangular-spiral coil that is provided on a substrate 1, and the second coil antenna 20 is a rectangular-spiral coil that is provided on a substrate 2. The winding axis directions of first coil antenna 10 and the second coil antenna 20 are parallel or substantially parallel to each other (i.e., the same or substantially the same direction).

The feeder coil 30 is a coil defined by a helical coil conductor, which extends along a square cylinder or a substantially square cylinder, in a rectangular-parallelepiped multilayer body. The feeder coil 30 includes a winding axis that extends in a direction perpendicular or substantially perpendicular to the winding axis of the first coil antenna 10, and includes a first coil aperture E1 and a second coil aperture E2. The feeder coil 30 is located between the first coil antenna 10 and the second coil antenna 20 in a height direction (winding axis direction of first coil antenna 10 and second coil antenna 20).

The first coil aperture E1 is closer to a coil aperture AP1 of the first coil antenna 10 than the second coil aperture E2 in a plan view along the winding axis direction of the first coil antenna 10. In addition, the second coil aperture E2 is closer to a coil aperture AP2 of the second coil antenna 20 than the first coil aperture E1 in a plan view along the winding axis direction of the second coil antenna 20.

In this preferred embodiment, as illustrated in FIG. 1A, the first coil antenna 10 and the second coil antenna 20 are connected in series with each other. As illustrated in FIG. 1B, magnetic fluxes φ1 and φ2, which flow in the same or substantially the same direction, respectively interlink with the first coil antenna 10 and the second coil antenna 20, and currents are induced in the same or substantially the same direction in the first coil antenna 10 and the second coil antenna 20 (induced in direction in which currents are added up). In other words, the first coil antenna 10 and the second coil antenna 20 are connected to each other in a polarity such that the magnetic fluxes thereof with respect to the winding axis direction of the first coil antenna 10 are in phase with each other.

As illustrated in FIG. 1B, the feeder coil 30 and the first coil antenna 10 are magnetic-field coupled with each other via magnetic flux φ13, and the feeder coil 30 and the second coil antenna 20 are magnetic-field coupled with each other via magnetic flux φ23. The feeder coil 30 includes a winding axis that extends in a direction perpendicular or substantially perpendicular to the winding axis of the first coil antenna 10, and includes the first coil aperture E1 and the second coil aperture E2, and the feeder coil 30 is located between the first coil antenna 10 and the second coil antenna 20 in the height direction (winding axis direction) thereof, and therefore the direction of the magnetic flux φ1 that passes through the first coil antenna 10 and the direction of the magnetic flux φ2 that passes through the second coil antenna 20 are identical.

According to this preferred embodiment, the magnetic fluxes (φ1 and φ2) that pass through (radiate from or are incident to) the first coil antenna 10 and the second coil antenna 20 flow in the same or substantially the same direction via the feeder coil 30 without obstructing each other, and therefore good communication characteristics are provided. In other words, the feeder coil 30 is strongly coupled with both the first coil antenna 10 and the second coil antenna 20, and as a result, the first coil antenna 10 and the second coil antenna 20 define and function as highly efficient radiating bodies.

Second Preferred Embodiment

In a second preferred embodiment of the present invention, an example is described in which the structure of the first coil antenna 10 and the second coil antenna 20 is different from that in the first preferred embodiment.

Figure 2A:
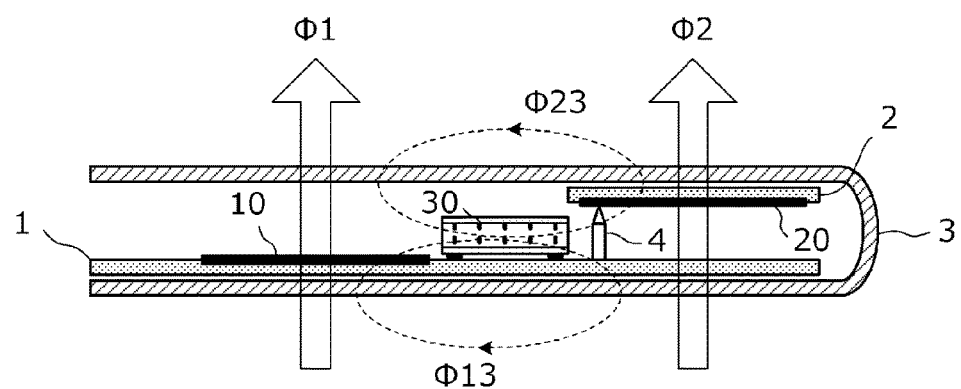
FIG. 2A is a front view of an antenna device 102A according to a second preferred embodiment of the present invention.
Figure 2B:
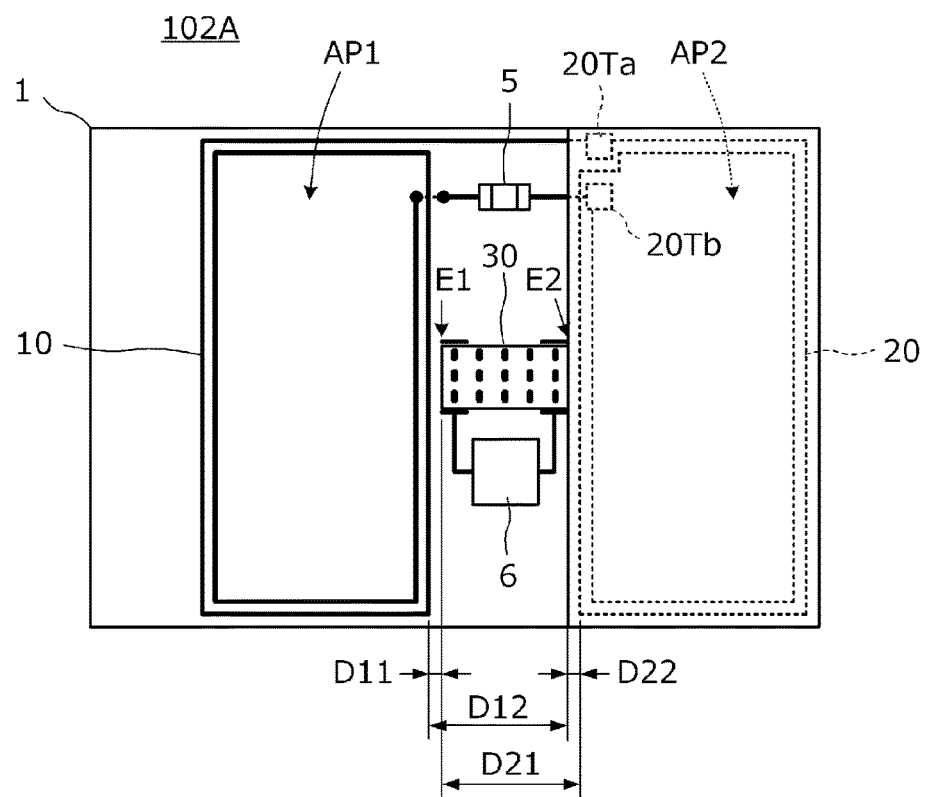
FIG. 2B is a plan view of the antenna device 102A.

FIG. 2A is a front view of an antenna device 102A according to the second preferred embodiment, and FIG. 2B is a plan view of the antenna device 102A.

The antenna device 102A includes a first coil antenna 10, a second coil antenna 20, and a feeder coil 30. The first coil antenna 10 is a rectangular-spiral coil that is provided on a substrate 1, and the second coil antenna 20 is a rectangular-spiral coil that is provided on a substrate 2. The winding axis directions of the first coil antenna 10 and the second coil antenna 20 are parallel or substantially parallel to each other.

A chip capacitor 5, which is serially connected to the first coil antenna 10, is mounted on the substrate 1. In addition, the feeder coil 30 and an RFIC 6 are mounted on the substrate 1. A resonance chip capacitor, a filter circuit, a matching network, and the like may be connected between the feeder coil 30 and the RFIC 6.

The feeder coil 30 is a coil in which a helical coil conductor is provided as described in the first preferred embodiment. The feeder coil 30 includes a winding axis that extends in a direction perpendicular or substantially perpendicular to the winding axis of the first coil antenna 10, and includes a first coil aperture E1 and a second coil aperture E2. The RFIC 6 is connected to the feeder coil 30.

The substrate 1 and the substrate 2 are provided on a flexible substrate 3. The flexible substrate 3 is folded back on itself as illustrated in FIG. 2B. Two movable probe pins 4 are mounted on the substrate 1. The two movable probe pins 4 contact two ends 20Ta and 20Tb of the second coil antenna 20. Thus, the first coil antenna 10 and the second coil antenna 20 are electrically connected to each other via the two movable probe pins 4.

The feeder coil 30 is located between the first coil antenna 10 and the second coil antenna 20 in the height direction (winding axis direction of first coil antenna 10 and second coil antenna 20).

Similar to the first preferred embodiment, the first coil aperture E1 is closer to a coil aperture AP1 of the first coil antenna 10 than the second coil aperture E2 in a plan view along the winding axis direction of the first coil antenna 10 (D11<D12). In addition, the second coil aperture E2 is closer to a coil aperture AP2 of the second coil antenna 20 than the first coil aperture E1 in a plan view along the winding axis direction of the second coil antenna 20 (D22<D21).

In addition, similarly to the first preferred embodiment, the first coil antenna 10 and the second coil antenna 20 are connected to each other in a polarity such that the magnetic fluxes thereof are with respect to the winding axis direction of the first coil antenna 10 in phase with each other.

Figure 3:
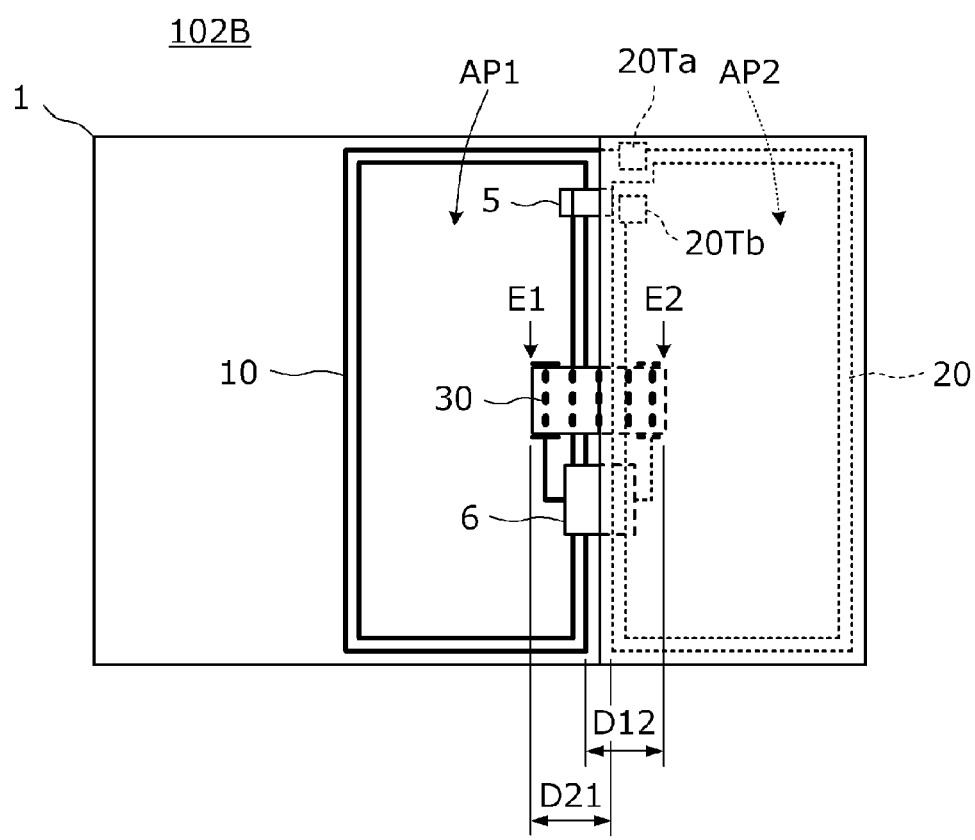
FIG. 3 is a plan view of another antenna device 102B according to the second preferred embodiment of the present invention.

FIG. 3 is a plan view of another antenna device 102B according to the second preferred embodiment. The distance between the first coil antenna 10 and the second coil antenna 20 and the positional relationship between the first coil antenna 10, the second coil antenna 20 and the feeder coil 30 are different from those in the antenna device 102A illustrated in FIG. 2A.

In the antenna device 102B, the first coil aperture E1 of the feeder coil 30 is positioned inside the coil aperture AP1 of the first coil antenna 10, and therefore the distance D11 between the coil aperture AP1 of the first coil antenna 10 and the first coil aperture E1 is equal to or substantially equal to zero. Similarly, the second coil aperture E2 of the feeder coil 30 is positioned inside the coil aperture AP2 of the second coil antenna 20, and therefore the distance D22 between the coil aperture AP2 of the second coil antenna 20 and the second coil aperture E2 is equal to or substantially equal to zero.

According to the structure of the antenna device 102B, since the distances D11 and D22 are equal to or substantially equal to zero, both the coupling coefficient between the feeder coil 30 and the first coil antenna 10 and the coupling coefficient between the feeder coil 30 and the second coil antenna 20 are high.

Third Preferred Embodiment

In a third preferred embodiment of the present invention, an example is described in which the shapes of the first coil antenna 10 and the second coil antenna 20 are different from those in the first and second preferred embodiments.

Figure 4:
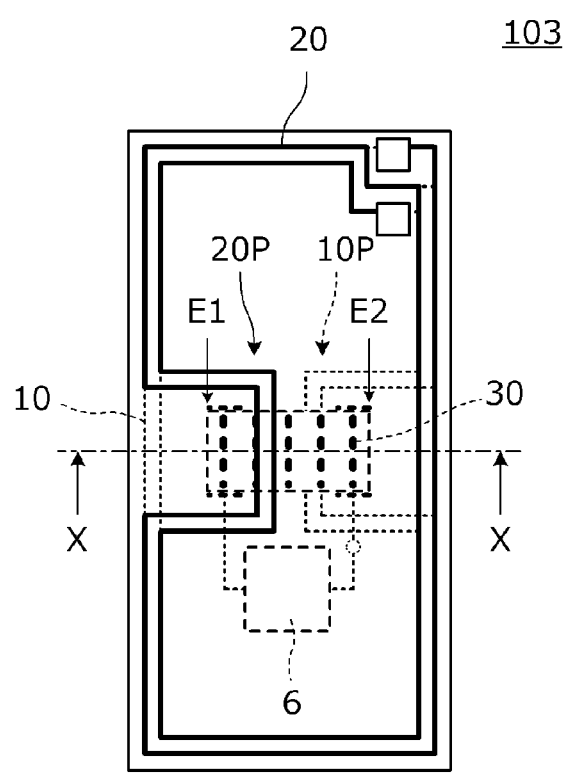
FIG. 4 is a plan view of an antenna device 103 according to a third preferred embodiment of the present invention.
Figure 5:
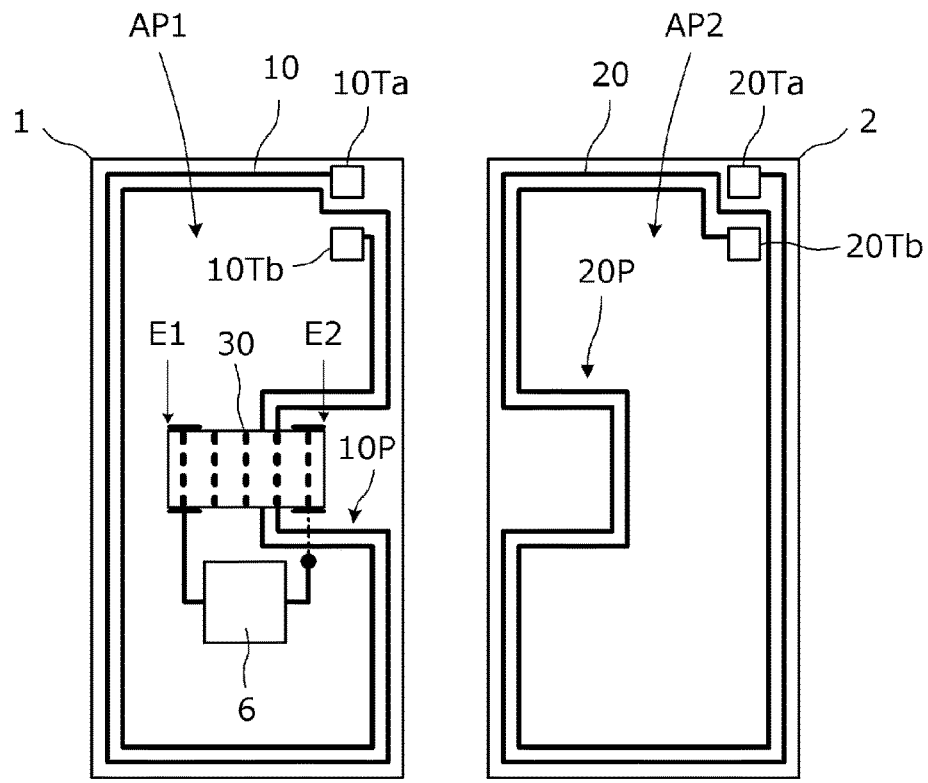
FIG. 5 is a plan view in which a first coil antenna 10 and a second coil antenna 20 of the antenna device 103 shown in FIG. 4 are illustrated in a separated manner.
Figure 6:
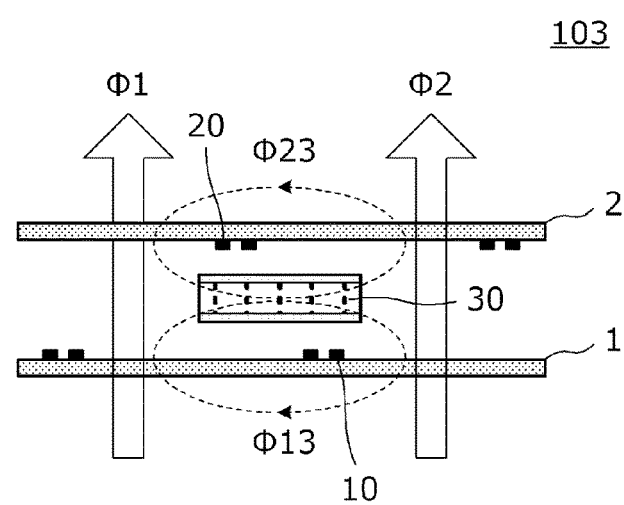
FIG. 6 is a sectional view taken along X-X in FIG. 4.

FIG. 4 is a plan view of an antenna device 103 according to a third preferred embodiment. FIG. 5 is a plan view in which the first coil antenna 10 and the second coil antenna 20 of the antenna device 103 are illustrated in a separated manner. FIG. 6 is a sectional view taken along X-X in FIG. 4.

The antenna device 103 includes the first coil antenna 10, the second coil antenna 20, and a feeder coil 30. The first coil antenna 10 is a substantially rectangular-spiral coil that is provided on a substrate 1, and the second coil antenna 20 is a substantially rectangular-spiral coil that is provided on a substrate 2. The first coil antenna 10 includes a modified-shape portion 10P where the first coil antenna 10 extends in a direction from the second coil aperture E2 toward the first coil aperture E1 in a plan view along the winding axis direction of the first coil antenna 10. In addition, the second coil antenna 20 includes a modified-shape portion 20P where the second coil antenna 20 extends in a direction from the first coil aperture E1 toward the second coil aperture E2 in a plan view along the winding axis direction of the second coil antenna 20.

The first coil aperture E1 is positioned inside the coil aperture AP1 of the first coil antenna 10 and the second coil aperture E2 is positioned outside the coil aperture AP1 of the first coil antenna 10 in a plan view along the winding axis direction of the first coil antenna 10. In addition, the second coil aperture E2 is positioned inside the coil aperture AP2 of the second coil antenna 20 and the first coil aperture E1 is positioned outside the coil aperture AP2 of the second coil antenna 20 in a plan view along the winding axis direction of the second coil antenna 20.

Two ends 10Ta and 10Tb of the first coil antenna 10 are respectively connected to two ends 20Ta and 20Tb of the second coil antenna 20. In this way, the first coil antenna 10 and the second coil antenna 20 are connected in parallel with each other. In this parallel connected state, the first coil antenna 10 and the second coil antenna 20 are connected to each other in a polarity such that the magnetic fluxes thereof with respect to the winding axis direction of the first coil antenna 10 are in phase with each other.

As illustrated in FIG. 6, the feeder coil 30 and the first coil antenna 10 are magnetic-field coupled with each other via magnetic flux φ13, and the feeder coil 30 and the second coil antenna 20 are magnetic-field coupled with each other via magnetic flux φ23. The directions of the magnetic fluxes φ1 and φ13 that pass through the first coil antenna 10 and the directions of the magnetic fluxes φ2 and φ23 that pass through the second coil antenna 20 are identical.

According to this preferred embodiment, the surface area in plan view is able to be smaller and a small-size antenna device is able to be provided. In addition, by stacking the first coil antenna 10 and the second coil antenna 20 on top of one another, the first coil antenna 10 and the second coil antenna 20 couple with each other and strengthen each other's inductances, and therefore the efficiencies of the coil antennas as radiating bodies are increased.

Fourth Preferred Embodiment

In a fourth preferred embodiment of the present invention, an example is described in which the feeder coil 30 and the first coil antenna 10 are coupled with each other and the feeder coil 30 and the second coil antenna 20 are not coupled with each other.

Figure 7:
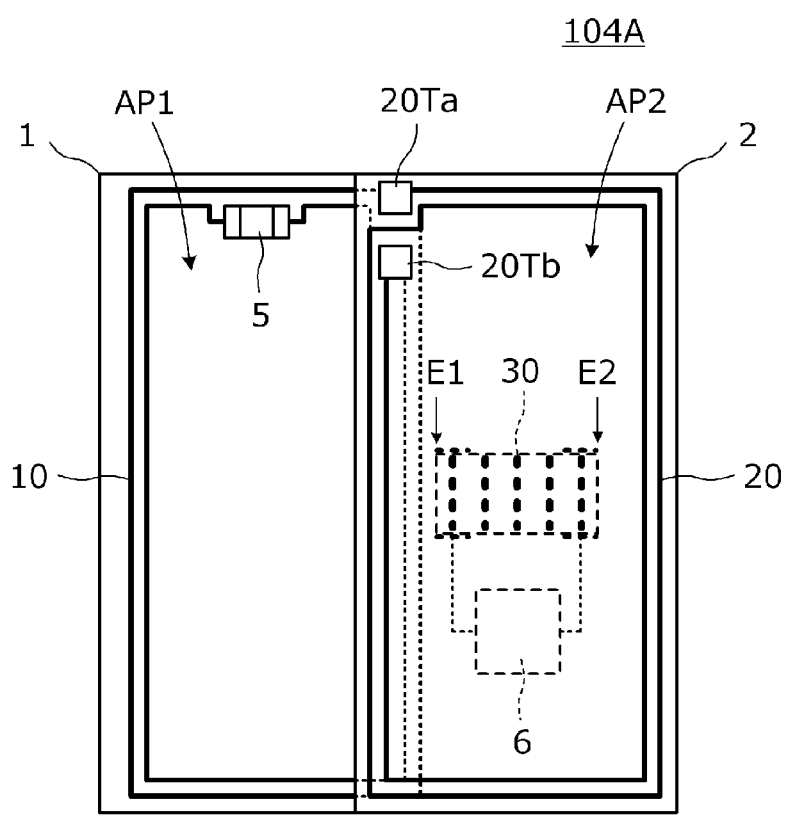
FIG. 7 is a plan view of an antenna device 104A according to a fourth preferred embodiment of the present invention.

FIG. 7 is a plan view of an antenna device 104A according to the fourth preferred embodiment. The antenna device 104A includes the first coil antenna 10, the second coil antenna 20, and the feeder coil 30. The first coil antenna 10 is a rectangular-spiral coil that is provided on a substrate 1, and the second coil antenna 20 is a rectangular-spiral coil that is provided on a substrate 2. The winding axis directions of first coil antenna 10 and the second coil antenna 20 are parallel or substantially parallel to each other.

A chip capacitor 5, which is serially connected to the first coil antenna 10, is mounted on the substrate 1. In addition, the feeder coil 30 and an RFIC 6 are mounted on the substrate 1. A resonance chip capacitor, a filter circuit, a matching network and the like may be connected between the feeder coil 30 and the RFIC 6.

The position of the second coil antenna 20 is different from that in the antenna device 102A illustrated in FIG. 2A in the first preferred embodiment. The first coil aperture E1 is closer to the coil aperture AP1 of the first coil antenna 10 than the second coil aperture E2 in a plan view along the winding axis direction of the first coil antenna 10. In addition, the first coil aperture E1 and the second coil aperture E2 are both positioned inside the coil aperture AP2 of the second coil antenna 20 in a plan view along the winding axis direction of the second coil antenna 20. Therefore, the magnetic flux that passes through the feeder coil 30 interlinks with the coil aperture AP1 of the first coil antenna 10, and the feeder coil 30 magnetic-field couples with the first coil antenna 10. On the other hand, the magnetic flux that passes through the feeder coil 30 enters and leaves the coil aperture AP2 of the second coil antenna 20 in equal or substantially equal amounts, and therefore the feeder coil 30 and the second coil antenna 20 substantially do not magnetic-field couple with each other.

The two ends of the first coil antenna 10 are respectively connected to two ends 20Ta and 20Tb of the second coil antenna 20 via movable probe pins. Thus, the first coil antenna 10 and the second coil antenna 20 are electrically connected to each other via the two movable probe pins.

Figure 8:
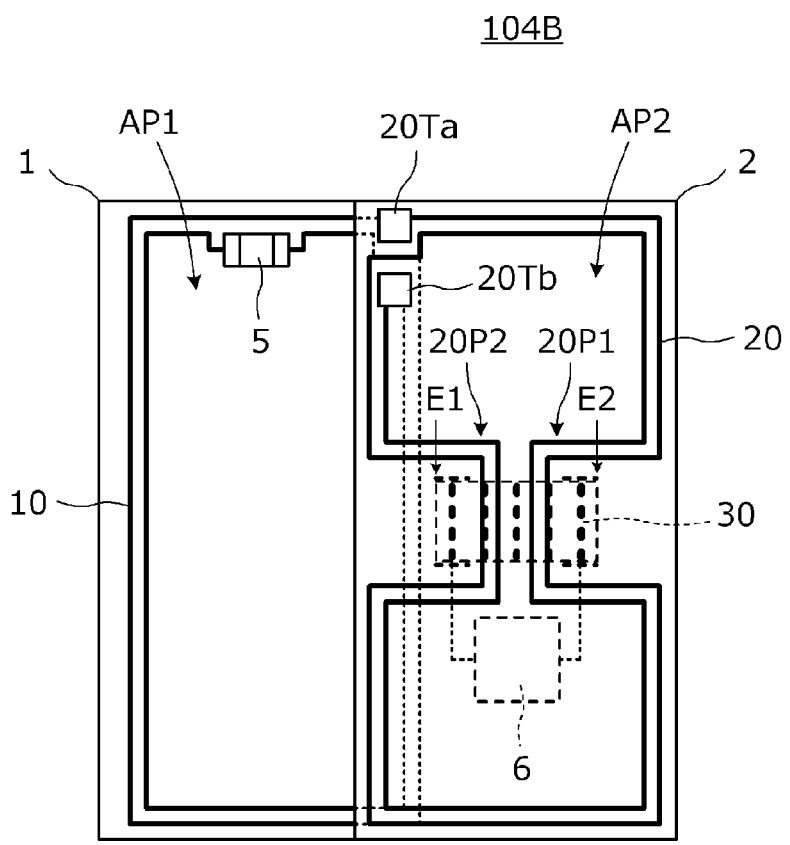
FIG. 8 is a plan view of another antenna device 104B according to the fourth preferred embodiment of the present invention.

FIG. 8 is a plan view of another antenna device 104B according to the fourth preferred embodiment. The shape of the second coil antenna 20 is different from that in the antenna device 104A. The second coil antenna 20 includes a modified-shape portion 20P1 where the second coil antenna 20 extends in a direction from the first coil aperture E1 toward the second coil aperture E2 and a modified-shape portion 20P2 where the second coil antenna 20 extends in a direction from the second coil aperture E2 toward the first coil aperture E1 in a plan view along the winding axis direction of the second coil antenna 20. The first coil aperture E1 and the second coil aperture E2 are both positioned outside the coil aperture AP2 of the second coil antenna 20 in a plan view along the winding axis direction of the second coil antenna 20. Therefore, the magnetic flux that passes through the feeder coil 30 interlinks with the coil aperture AP1 of the first coil antenna 10, and the feeder coil 30 magnetic-field couples with the first coil antenna 10. On the other hand, the magnetic flux that passes through the feeder coil 30 does not interlink with the coil aperture AP2 of the second coil antenna 20, and therefore the feeder coil 30 and the second coil antenna 20 substantially do not magnetic-field couple with each other.

Figure 9:
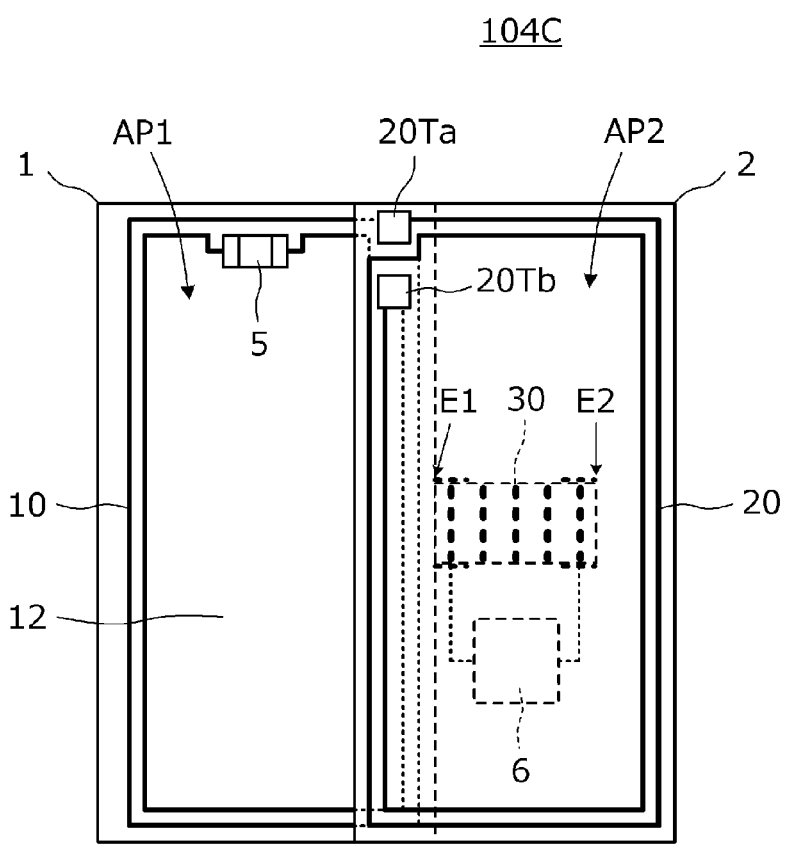
FIG. 9 is a plan view of another antenna device 104C according to the fourth preferred embodiment of the present invention.

FIG. 9 is a plan view of another antenna device 104C according to the fourth preferred embodiment. The antenna device 104C is produced by providing a magnetic sheet 12 on the rear surface side of the first coil antenna 10 of the antenna device 104A illustrated in FIG. 7. By providing the magnetic sheet 12 on the opposite side from the feeder coil 30 to sandwich the first coil antenna 10 therebetween, the coupling coefficient between the feeder coil 30 and the first coil antenna 10 is able to be increased.

According to this preferred embodiment, in the case where coupling between the first coil antenna 10 and the feeder coil 30 is hindered by coupling between the second coil antenna 20 and the feeder coil 30, the degree of coupling between the first coil antenna and the feeder coil is able to be increased by significantly reducing or preventing the coupling between the second coil antenna 20 and the feeder coil 30.

The number of turns of the first coil antenna 10 may be greater than the number of turns of the second coil antenna 20. In this way, the coupling coefficient between the first coil antenna 10 and the feeder coil 30 is able to be increased while ensuring that the total inductance of the first coil antenna 10 and the second coil antenna 20 remains the same or substantially the same.

Fifth Preferred Embodiment

In a fifth preferred embodiment of the present invention, an example is described in which the structure of the first coil antenna 10 and the second coil antenna 20 is different from that in the fourth preferred embodiment.

Figure 10:
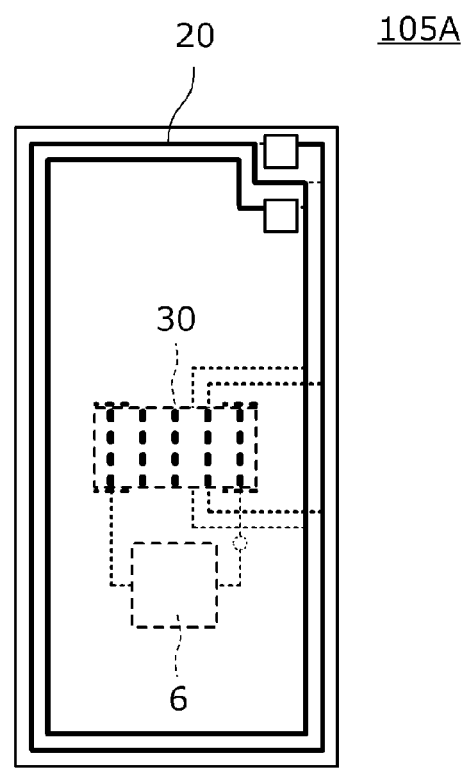
FIG. 10 is a plan view of an antenna device 105A according to a fifth preferred embodiment of the present invention.
Figure 11:
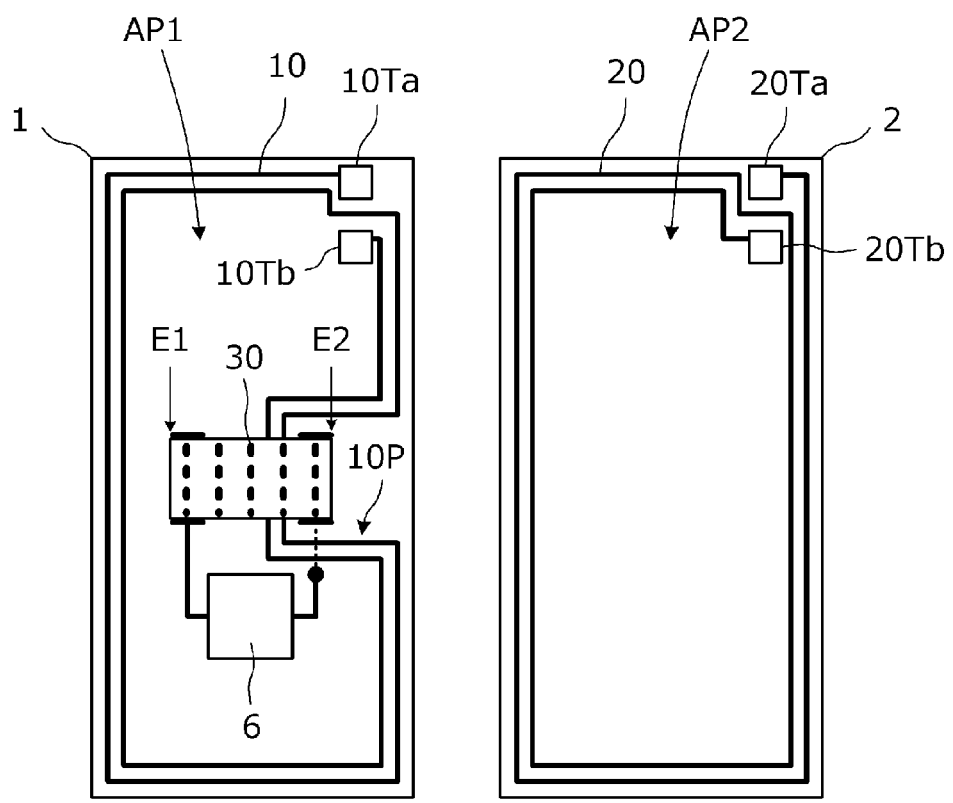
FIG. 11 is a plan view in which a first coil antenna 10 and a second coil antenna 20 of the antenna device 105A are illustrated in a separated manner.

FIG. 10 is a plan view of an antenna device 105A according to the fifth preferred embodiment. FIG. 11 is a plan view in which the first coil antenna 10 and the second coil antenna 20 of the antenna device 105A are illustrated in a separated manner.

The antenna device 105A includes the first coil antenna 10, the second coil antenna 20, and a feeder coil 30. The first coil antenna 10 is a substantially rectangular-spiral coil that is provided on a substrate 1, and the second coil antenna 20 is a rectangular-spiral coil that is provided on a substrate 2. The first coil antenna 10 includes a modified-shape portion 10P where the first coil antenna 10 extends in a direction from the second coil aperture E2 toward the first coil aperture E1 in a plan view along the winding axis direction of the first coil antenna 10.

The first coil aperture E1 is positioned inside the coil aperture AP1 of the first coil antenna 10 and the second coil aperture E2 is positioned outside the coil aperture AP1 of the first coil antenna 10 in a plan view along the winding axis direction of the first coil antenna 10. In addition, the first coil aperture E1 and the second coil aperture E2 are both positioned inside the coil aperture AP2 of the second coil antenna 20 in a plan view along the winding axis direction of the second coil antenna 20. Therefore, the magnetic flux that passes through the feeder coil 30 interlinks with the coil aperture AP1 of the first coil antenna 10, and the feeder coil 30 magnetic-field couples with the first coil antenna 10. On the other hand, the magnetic flux that passes through the feeder coil 30 enters and leaves the coil aperture AP2 of the second coil antenna 20 in equal or substantially equal amounts, and therefore the feeder coil 30 and the second coil antenna 20 substantially do not magnetic-field couple with each other.

Two ends 10Ta and 10Tb of the first coil antenna 10 are respectively connected to two ends 20Ta and 20Tb of the second coil antenna 20. In this way, the first coil antenna 10 and the second coil antenna 20 are connected in parallel with each other. In this parallel connected state, the first coil antenna 10 and the second coil antenna 20 are connected to each other in a polarity such that the magnetic fluxes thereof with respect to the winding axis direction of the first coil antenna 10 are in phase with each other.

Figure 12:
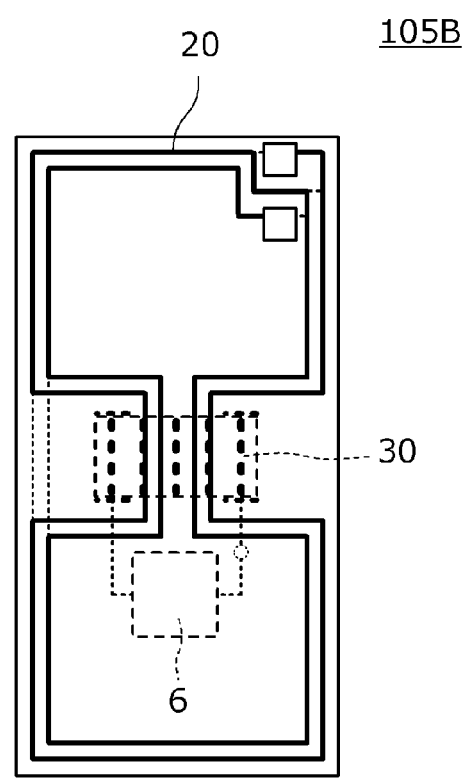
FIG. 12 is a plan view of another antenna device 105B according to the fifth preferred embodiment of the present invention.
Figure 13:
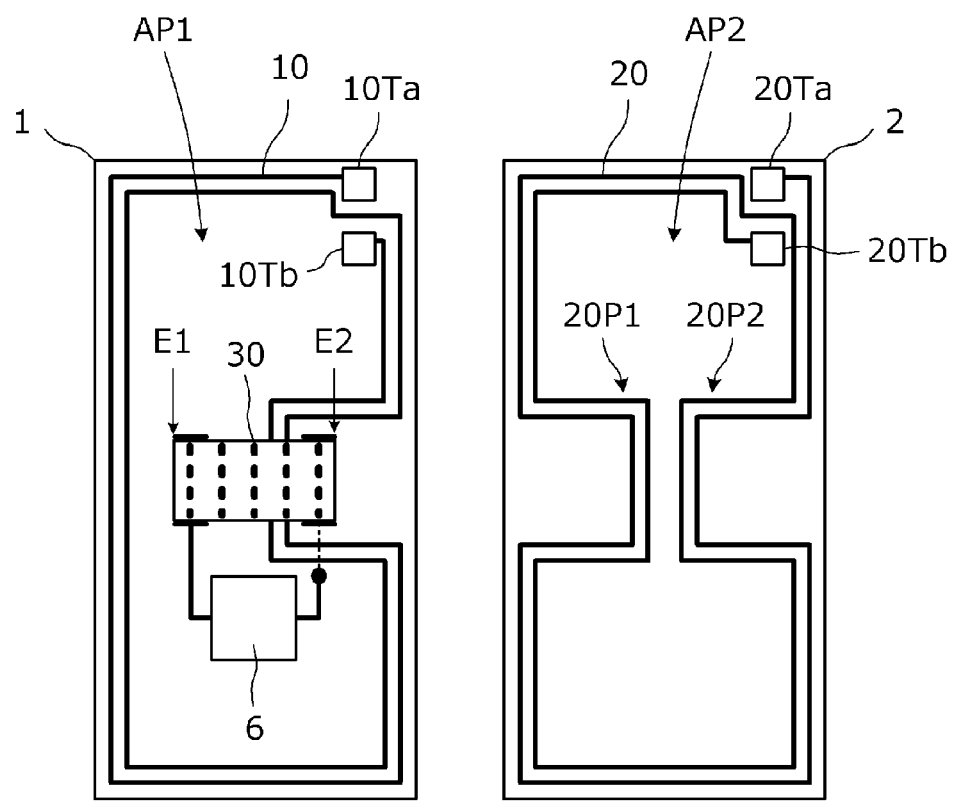
FIG. 13 is a plan view in which a first coil antenna 10 and a second coil antenna 20 of the antenna device 105B are illustrated in a separated manner.

FIG. 12 is a plan view of another antenna device 105B according to the fifth preferred embodiment. FIG. 13 is a plan view in which the first coil antenna 10 and the second coil antenna 20 of the antenna device 105B are illustrated in a separated manner.

The antenna device 105B includes the first coil antenna 10, the second coil antenna 20, and a feeder coil 30. The first coil antenna 10 is a substantially rectangular-spiral coil that is provided on a substrate 1, and the second coil antenna 20 is a substantially rectangular-spiral coil that is provided on a substrate 2. The first coil antenna 10 includes a modified-shape portion 10P where the first coil antenna 10 extends in a direction from the second coil aperture E2 toward the first coil aperture E1 in a plan view along the winding axis direction of the first coil antenna 10. In addition, the second coil antenna 20 includes a modified-shape portion 20P1 where the second coil antenna 20 extends in a direction from the first coil aperture E1 toward the second coil aperture E2 and a modified-shape portion 20P2 where the second coil antenna 20 extends in a direction from the second coil aperture E2 toward the first coil aperture E1 in a plan view along the winding axis direction of the second coil antenna 20.

The first coil aperture E1 is positioned inside the coil aperture AP1 of the first coil antenna 10 and the second coil aperture E2 is positioned outside the coil aperture AP1 of the first coil antenna 10 in a plan view along the winding axis direction of the first coil antenna 10. The first coil aperture E1 and the second coil aperture E2 are both positioned outside the coil aperture AP2 of the second coil antenna 20 in a plan view along the winding axis direction of the second coil antenna 20. Therefore, the magnetic flux that passes through the feeder coil 30 interlinks with the coil aperture AP1 of the first coil antenna 10, and the feeder coil 30 magnetic-field couples with the first coil antenna 10. On the other hand, the magnetic flux that passes through the feeder coil 30 does not interlink with the coil aperture AP2 of the second coil antenna 20, and therefore the feeder coil 30 and the second coil antenna 20 substantially do not magnetic-field couple with each other.

Sixth Preferred Embodiment

In a sixth preferred embodiment of the present invention, an example of an electronic appliance is described in which a portion of a casing is implemented as a second coil antenna, and an example of an electronic appliance is described in which a portion of a casing is implemented as an antenna of another communication system.

Figure 14A:
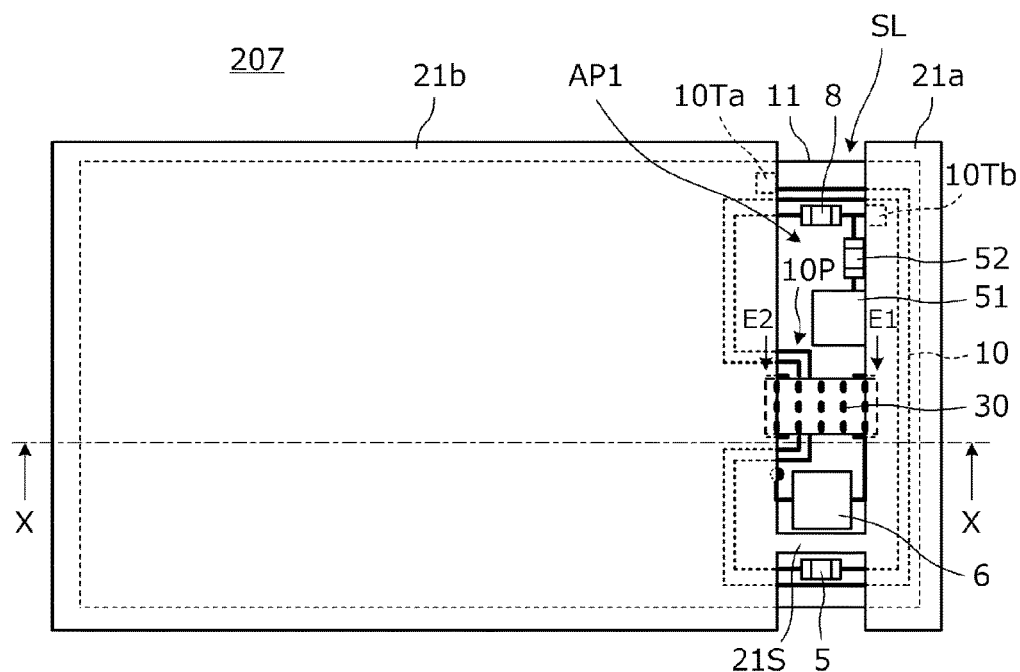
FIG. 14A is a plan view of the main portions of an electronic appliance 207 according to a sixth preferred embodiment of the present invention.
Figure 14B:
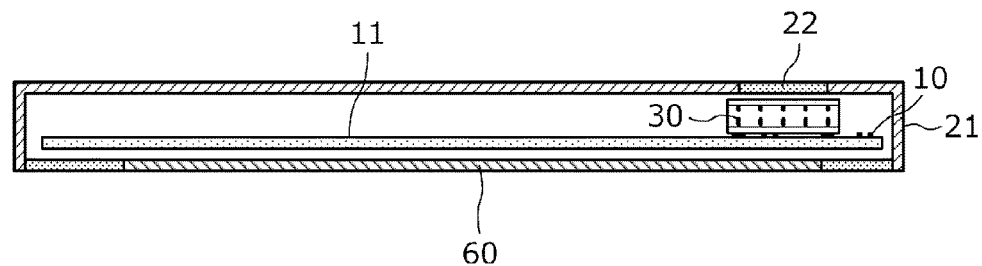
FIG. 14B is a sectional view taken along X-X in FIG. 14A.

FIG. 14A is a plan view of the main portions of an electronic appliance 207 according to the sixth preferred embodiment and FIG. 14B is a sectional view taken along X-X in FIG. 14A. The electronic appliance 207 is a mobile electronic appliance, for example, a smart phone, and includes metal casings 21a and 21b located on the opposite side from a surface where a display 60 is located. That is, the metal casings 21a and 21b are electrically conductive casings. The metal casings 21a and 21b are connected to each other at a prescribed position by a stub 21S. A gap between the metal casings 21a and 21b defines a slit SL. A casing resin portion 22 is provided in (closes) the slit SL. A circuit board 11 is provided inside the metal casings 21. The first coil antenna 10 is provided on a front surface of the circuit board 11. In addition, the feeder coil 30, chip capacitors 5 and 52, a chip inductor 8, and RFICs 6 and 51 are mounted on the circuit board 11. A resonance chip capacitor, a filter circuit, a matching network and the like may be connected between the feeder coil 30 and the RFIC 6.

The chip capacitor 5 and the chip inductor 8 are serially connected at points partway along the first coil antenna 10. A first end 10Ta and a second end 10Tb of the first coil antenna 10 respectively contact two sides, which are separated by the slit SL, of the metal casing 21 via movable probe pins (not illustrated). Therefore, a current path that is provided by inner edges of the slit SL defined by the metal casing 21a and 21b and the stub 21S, and the movable probe pins defines and functions as the second coil antenna. The first coil antenna 10 is electrically connected to the second coil antenna. An LC resonance circuit is defined by inductance components and capacitance components included in a series connection circuit consisting of the first coil antenna 10, the second coil antenna, the chip capacitor 5, and the chip inductor 8. The resonant frequency of this LC resonance circuit is equal to or substantially equal to the NFC communication carrier frequency. Alternatively, the resonant frequency is close to the NFC communication carrier frequency.

A first coil aperture E1 of the feeder coil 30 is positioned inside a coil aperture AP1 of the first coil antenna 10, and a second coil aperture E2 of the feeder coil 30 is positioned outside the coil aperture AP1 of the first coil antenna 10. In addition, the feeder coil 30 is positioned in the center of the slit SL, which corresponds to the coil aperture of the second coil antenna in a plan view of the metal casing 21. Therefore, the feeder coil 30 is magnetic-field coupled with the first coil antenna 10 and is substantially not coupled with the second coil antenna.

According to this preferred embodiment, since a portion of a metal casing is used to define and function as a coil antenna, an electronic appliance is able to be provided that is equipped with a coil antenna while also being covered by a metal casing.

An inverted F antenna is defined by the metal casings 21a and 21b and the stub 21S. The RFIC 51 is an IC for long-range wireless communication (far-field communication) other than NFC, for example, cellular communication, a wireless LAN, Bluetooth (registered trademark) or GPS. The carrier frequencies of these long-range wireless communication systems are higher than the carrier frequency of NFC. The RFIC 51 feeds power to the inverted F antenna via the chip capacitor 52. The impedance of the chip inductor 8 is high and the chip inductor 8 is in an equivalently open state at the communication frequency in which the RFIC 51 operates. Therefore, the inverted F antenna defines and functions as an antenna for long-range wireless communication (far-field communication) independently of the first coil antenna 10 and the second coil antenna.

A filter or a switch, for example, a low pass filter that blocks a communication frequency band of cellular communication or the like, may be provided instead of the chip inductor 8. In addition, the chip inductor 8 may contribute to resonance at the NFC communication frequency. In addition, a filter or a switch, for example, a high pass filter that blocks the NFC communication frequency band, may be provided instead of the chip capacitor 52. In addition, a filter or a matching network may be provided in a stage subsequent to the RFIC 51 (antenna side).

A radiating element that radiates electromagnetic waves a long distance (far field) and a radiating element of a standing wave antenna are examples of an inverted F antenna. The term "radiating element that radiates electromagnetic waves a long distance (far field)" described herein refers to a radiating element that radiates electromagnetic waves a distance that is considerably longer than the wavelength of the carrier signal. Specifically, the term refers to a radiating element that is separated from the communication partner by a distance greater than or equal to the wavelength and that performs communication via electromagnetic waves. In addition, the term "standing wave antenna" refers to a radiating element that generates a standing wave as a result of an electromagnetic field resonating on the radiating element and a potential or current distribution being generated on the radiating element. In this preferred embodiment, a case has been described in which the radiating element of a standing wave antenna is an inverted F antenna, but the radiating element may instead be another type of standing wave antenna, for example, a dipole antenna, a monopole antenna, or a slot antenna.

Seventh Preferred Embodiment

In a seventh preferred embodiment of the present invention, an example of an electronic appliance is described in which a portion of a casing is implemented as a second coil antenna, and a portion of a casing is implemented as an antenna of another communication system.

Figure 15A:
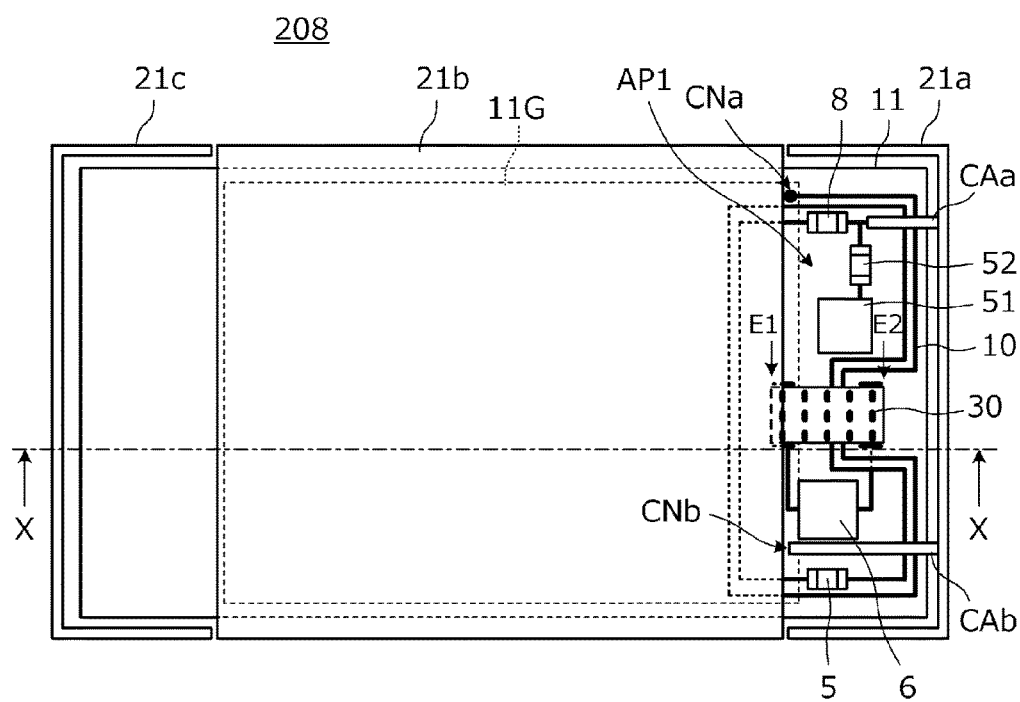
FIG. 15A is a plan view of the main portions of an electronic appliance 208 according to a seventh preferred embodiment of the present invention.
Figure 15B:
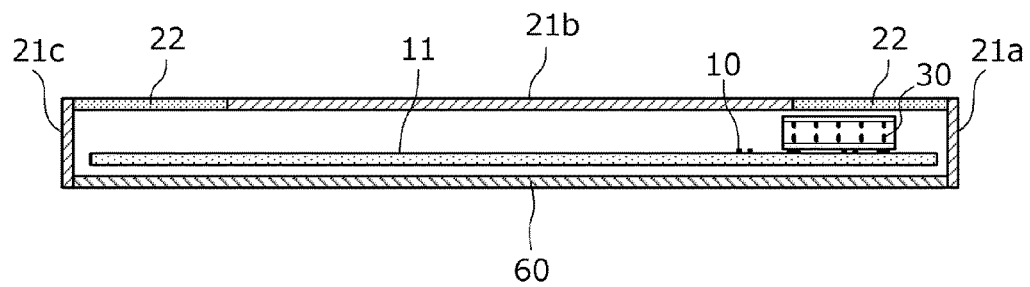
FIG. 15B is a sectional view taken along X-X in FIG. 15A.

FIG. 15A is a plan view of the main portions of an electronic appliance 208 according to the seventh preferred embodiment and FIG. 15B is a sectional view taken along X-X in FIG. 15A. The electronic appliance 208 is a mobile electronic appliance, for example, a smart phone, and includes a metal casing 21b located on the opposite side from a surface where a display 60 is located, and includes, at both ends thereof, frame metal casings 21a and 21c that each define a portion of a side surface that connects the two main surfaces of the electronic appliance 208 to each other (surface where display 60 is located and opposite surface). That is, the metal casings 21a, 21b, and 21c are electrically conductive casings. Casing resin portions 22 are provided in the gap between the metal casings 21a and 21b and in the gap between the metal casings 21c and 21b. A circuit board 11 is provided inside the metal casings 21. A first coil antenna 10 is provided on a front surface of the circuit board 11. In addition, a planar conductor (circuit ground pattern) 11G is provided on the circuit board 11. The metal casing is connected to the planar conductor 11G. In addition, the feeder coil 30, chip capacitors 5 and 52, a chip inductor 8, and RFICs 6 and 51 are mounted on the circuit board 11.

The chip capacitor 5 and the chip inductor 8 are serially connected at points partway along the first coil antenna 10. A first end of the first coil antenna 10 is connected to a connection point CNa of the planar conductor 11G of the circuit board 11. A second end of the first coil antenna 10 is connected to a first connection point of the metal casing 21a via a cable CAa. In addition, a second connection point CNb of the planar conductor 11G and a second connection point of the metal casing 21a are connected to each other via a cable CAb. Therefore, a current path provided by the metal casing 21a, the planar conductor 11G, and the cables CAa and CAb defines and functions as a second coil antenna. The first coil antenna 10 is electrically connected to the second coil antenna. An LC resonance circuit is defined by inductance components and capacitance components included in a series connection circuit consisting of the first coil antenna 10, the second coil antenna, the chip capacitor 5, and the chip inductor 8.

A first coil aperture E1 of the feeder coil 30 is positioned inside a coil aperture AP1 of the first coil antenna 10, and a second coil aperture E2 of the feeder coil 30 is positioned outside the coil aperture AP1 of the first coil antenna 10. Therefore, the feeder coil 30 is magnetic-field coupled with the first coil antenna 10.

The planar conductor 11G is close to the apertures of the first coil antenna 10 and the feeder coil 30 (is partially superposed therewith in plan view), and therefore the planar conductor 11G also defines and functions as a radiating body.

Figure 16:
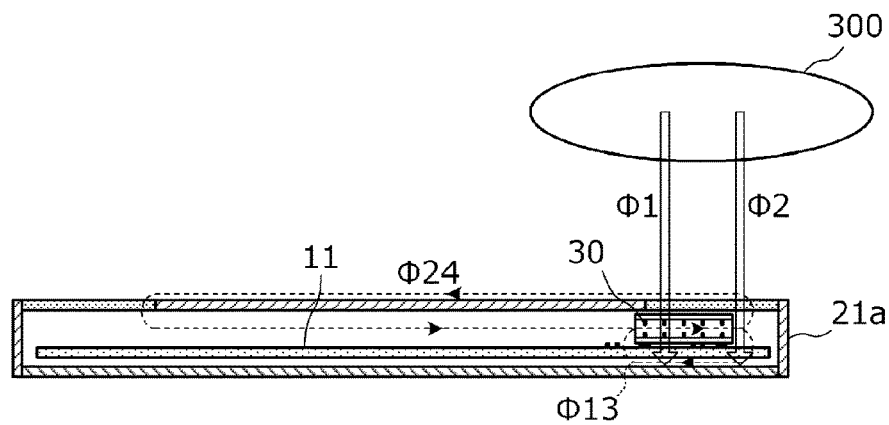
FIG. 16 illustrates magnetic-field coupling between a first coil antenna 10, a second coil antenna, and a feeder coil 30 of the electronic appliance 208 according to the seventh preferred embodiment of the present invention, and illustrates magnetic-field coupling between the electronic appliance 208 and an antenna of a communication partner.

FIG. 16 illustrates magnetic-field coupling between the first coil antenna 10, the second coil antenna, and the feeder coil 30, and illustrates magnetic-field coupling with an antenna of a communication partner. Magnetic fluxes p13 and p24 pass through the feeder coil 30, and magnetic fluxes φ1 and φ2 that pass through a communication-partner-side antenna 300 interlink with the first coil antenna 10 and the second coil antenna.

Eighth Preferred Embodiment

In an eighth preferred embodiment of the present invention, an example of a feeder coil in which a portion of a first coil antenna is included is described.

Figure 17:
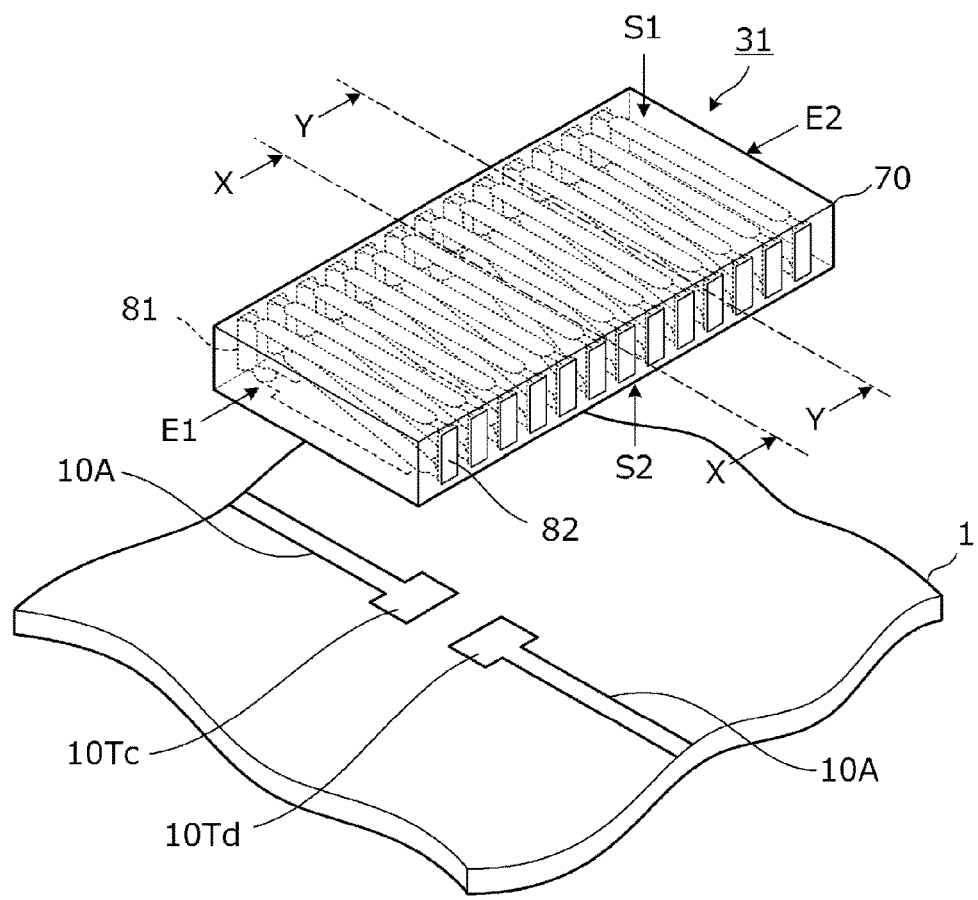
FIG. 17 is an exploded perspective view illustrating a feeder coil 31 that is mounted on a circuit board 11 in an electronic appliance according to an eighth preferred embodiment of the present invention.

FIG. 17 is an exploded perspective view illustrating a feeder coil 31 that is mounted on a circuit board 11 in an electronic appliance according to the eighth preferred embodiment.

The feeder coil 31 is a coil in which a first loop conductor, which defines a portion of a first coil antenna, and a helical coil conductor, which extends along a square cylinder or a substantially square cylinder, are provided in a rectangular-parallelepiped multilayer body 70. The winding axis directions of the coil conductor and the first loop conductor are parallel or substantially parallel to each other (i.e., extend in the same or substantially the same direction), and coincide with a longitudinal direction of the multilayer body 70. The feeder coil 31 is mounted on the front surface of the circuit board 11.

Two outer connection terminals, which are to be connected to an RFIC or the like, and two first coil antenna conductor connection terminals, which are to be connected to a first coil antenna conductor 10A, are provided on a bottom surface (mounting surface) of the feeder coil 31. The first coil antenna conductor 10A according to this preferred embodiment is connected to the first loop conductor of the feeder coil, and together the conductors define one coil antenna (first coil antenna). Connection terminals 10Tc and 10Td are included in the first coil antenna conductor 10A, and two first coil antenna conductor connection terminals of the feeder coil 31 are respectively connected to these connection terminals 10Tc and 10Td.

Figure 19A:
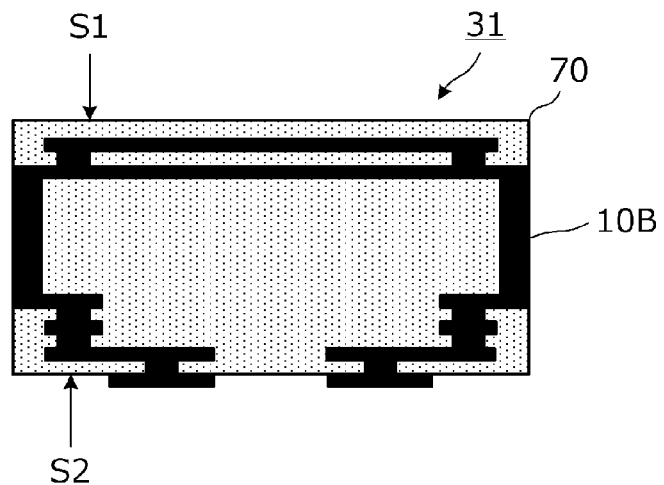
FIG. 19A is a sectional view taken along X-X in FIG. 17.
Figure 19B:
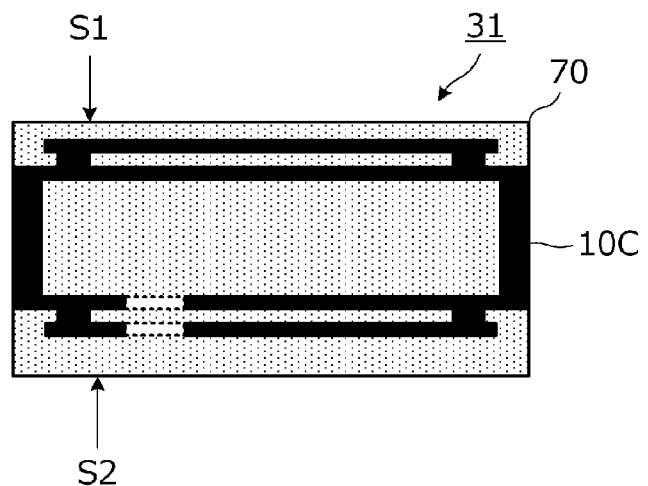
FIG. 19B is a sectional view taken along Y-Y in FIG. 17.

FIG. 18 is an exploded plan view illustrating electrode patterns and the like of individual substrate layers of the multilayer body 70 of the feeder coil 31. FIG. 19A is a sectional view taken along X-X in FIG. 17, and FIG. 19B is a sectional view taken along Y-Y in FIG. 17. In FIG. 19A, a first loop conductor 10B is shaded black, and in FIG. 19B, a coil conductor 10C is shaded black.

The multilayer body 70 is provided by sequentially stacking a plurality of substrate layers 7a to 7q illustrated in portions (1) to (17) of FIG. 18 on top of one another. In FIG. 18, portion (1) illustrates the lowermost layer and portion (17) illustrates the uppermost layer. The bottom surfaces of the substrate layers 7a to 7q are respectively illustrated in portions (1) to (17) of FIG. 18, and the bottom surface of the substrate layer 7a is a mounting surface of the multilayer body 70.

The substrate layers 7a, 7b, 7c, 7p, and 7q are rectangular-parallelepiped non-magnetic layers, and include a non-magnetic ferrite, for example. The substrate layers 7d to 7o are rectangular-parallelepiped magnetic layers, and include a magnetic ferrite, for example. In other words, the multilayer body 70 includes the substrate layers 7d to 7o, which are magnetic layers, sandwiched between the substrate layers 7a, 7b, 7c, 7p, and 7q, which are non-magnetic layers. The substrate layers 7a to 7q are not necessarily magnetic layers or non-magnetic layers, and it is sufficient for the substrate layers 7a to 7q to be insulator layers. In addition, the term "non-magnetic layer" described herein refers to a layer with a lower magnetic permeability than a magnetic layer, and a non-magnetic layer need not necessarily be formed of a non-magnetic substance, and may instead be formed of a magnetic substance with a relative magnetic permeability of greater than or equal to 1 and with a lower relative magnetic permeability than a magnetic layer.

Outer connection terminals 92A and 93A and first coil antenna conductor connection terminals 91A and 91B are provided on the bottom surface of the substrate layer 7a illustrated in portion (1) of FIG. 18. The outer connection terminals 92A and 93A are rectangular conductor patterns, and the first coil antenna conductor connection terminals 91A and 91B are rectangular conductor patterns.

Outer connection conductors 92B and 93B and first connection conductors 91C and 91D are provided on the bottom surface of the substrate layer 7b illustrated in portion (2) of FIG. 18. The outer connection conductors 92B and 93B are conductor patterns including rectangular or substantially rectangular shapes similar to those of the outer connection terminals 92A and 93A, and are respectively connected to the outer connection terminals 92A and 93A via interlayer connection conductors. The first connection conductors 91C and 91D are conductor patterns including rectangular or substantially rectangular shapes similar to those of the first coil antenna conductor connection terminals 91A and 91B, and are respectively connected to the first coil antenna conductor connection terminals 91A and 91B via interlayer connection conductors.

A plurality of third line conductors 73A are provided on the bottom surface of the substrate layer 7c illustrated in portion (3) of FIG. 18. The plurality of third line conductors 73A are conductor patterns that roughly extend from close to one edge of the substrate layer 7c in the lateral direction (left edge of substrate layer 7c in FIG. 18) to close to the other edge of the substrate layer 7c in the lateral direction (right edge of substrate layer 7c), and are arrayed in a longitudinal direction of the substrate layer 7c. For example, the third line conductors 73A are conductor patterns that are provided by forming a conductor film, for example, a Cu film, by a plating method or the like on a front surface of the substrate layer 7c, and then patterning the conductor film by photolithography. In addition, the third line conductors 73A may be formed by screen printing a conductive paste. Furthermore, a plurality of interlayer connection conductors are also provided on the substrate layer 7c.

First line conductors 71C and 71D and a plurality of third line conductors 73B, 73C, and 73D are provided on the bottom surface of the substrate layer 7d illustrated in portion (4) of FIG. 18.

The first line conductors 71C and 71D are conductor patterns that extend in the lateral direction of the substrate layer 7d. One end of the first line conductor 71C is connected to the first connection conductor 91C via an interlayer connection conductor and so forth provided on the substrate layers 7b and 7c. The other end of the first line conductor 71C faces one edge of the substrate layer 7d in the lateral direction, and is connected to a first end surface conductor 81 (described below). One end of the first line conductor 71D is connected to the first connection conductor 91D via an interlayer connection conductor and so forth provided on the substrate layers 7b and 7c. The other end of the first line conductor 71D faces the other edge of the substrate layer 7d in the lateral direction, and is connected to a second end surface conductor 82 (described below).

The plurality of third line conductors 73B are conductor patterns that are similar to the plurality of third line conductors 73A, and roughly extend from one edge to the other edge of the substrate layer 7d in the lateral direction, and are arrayed in the longitudinal direction of the substrate layer 7d. One ends of the third line conductors 73B face one edge of the substrate layer 7d in the lateral direction, and are respectively connected to first end surface conductors 81. The other ends of the third line conductors 73B face the other edge of the substrate layer 7d in the lateral direction, and are respectively connected to second end surface conductors 82. Furthermore, portions of the third line conductors 73B close to the one ends of the third line conductors 73B are connected to the one ends of the third line conductors 73A via interlayer connection conductors, and portions of the third line conductors 73B close to the other ends of the third line conductors 73B are connected to the other ends of the third line conductors 73A via interlayer connection conductors. Therefore, the third line conductors 73A and 73B are connected in parallel with each other.

The third line conductors 73C and 73D are conductor patterns that extend in the lateral direction of the substrate layer 7d. One end of the third line conductor 73C is connected to the outer connection conductor 92B via interlayer connection conductors and so forth provided on the substrate layers 7b and 7c. The other end of the third line conductor 73C faces one edge of the substrate layer 7d in the lateral direction, and is connected to a first end surface conductor 81. One end of the third line conductor 73D is connected to the outer connection conductor 93B via interlayer connection conductors and so forth provided on the substrate layers 7b and 7c. The other end of the third line conductor 73D faces one edge of the substrate layer 7d in the lateral direction, and is connected to a second end surface conductor 82.

The plurality of first end surface conductors 81 and the plurality of second end surface conductors 82 are provided on the substrate layers 7e to 7o illustrated in portions (5) to (15) of FIG. 18. The first end surface conductors 81 are interlayer connection conductors that face first edges of the substrate layers 7e to 7o in the lateral direction (left edges of substrate layers 7e to 7o in FIG. 18), and are arrayed in the longitudinal direction of the substrate layers 7e to 7o. The second end surface conductor 82 are interlayer connection conductors that face second edges of the substrate layers 7e to 7o in the lateral direction (right edges of substrate layers 7e to 7o in FIG. 18), and are arrayed in the longitudinal direction of the substrate layers 7e to 7o.

A first line conductor 71B and a plurality of second line conductors 72B are provided on the bottom surface of the substrate layer 7p illustrated in portion (16) of FIG. 18. The first line conductor 71B and the plurality of second line conductors 72B are conductor patterns that extend from one edge (left edge of substrate layer 7p in FIG. 18) to the other edge (right edge of substrate layer 7p in FIG. 18) of the substrate layer 7p in the lateral direction, and are arrayed in the longitudinal direction of the substrate layer 7p. One end of the first line conductor 71B faces one edge of the substrate layer 7p in the lateral direction, and is connected to a first end surface conductor 81. The other end of the first line conductor 71B faces the other edge of the substrate layer 7p in the lateral direction, and is connected to a second end surface conductor 82. First ends of the second line conductors 72B face the one edge of the substrate layer 7p in the lateral direction, and are respectively connected to the first end surface conductors 81. Second ends of the second line conductors 72B face the other edge of the substrate layer 7p in the lateral direction, and are respectively connected to the second end surface conductors 82.

A first line conductor 71A and a plurality of second line conductors 72A are provided on the bottom surface of the substrate layer 7q illustrated in portion (17) of FIG. 18. The first line conductor 71A and the plurality of second line conductors 72A are conductor patterns that are similar to the first line conductor 71B and the second line conductors 72B and extend from one edge (left edge of substrate layer 7q in FIG. 18) to the other edge (right edge of substrate layer 7q in FIG. 18) of the substrate layer 7q in the lateral direction, and are arrayed in the longitudinal direction of the substrate layer 7q. Furthermore, one end of the first line conductor 71A is connected to a portion of the first line conductor 71B that is close to one end of the first line conductor 71B via an interlayer connection conductor, and the other end of the first line conductor 71A is connected to a portion of the first line conductor 71B that is close to the other end of the first line conductor 71B via an interlayer connection conductor. Therefore, the first line conductors 71A and 71B are connected in parallel with each other. First ends of the second line conductors 72A are connected to portions of the second line conductors 72B that are close to first ends of the second line conductors 72B via interlayer connection conductors, and second ends of the second line conductors 72A are connected to portions of the second line conductors 72B that are close to second ends of the second line conductors 72B via interlayer connection conductors. Therefore, the second line conductors 72A and 72B are connected in parallel with each other.

A first loop conductor of substantially one turn (slightly less than one turn) and including a rectangular or substantially rectangular loop shape (refer to first loop conductor 10B in FIG. 19A) is defined by the first line conductors 71A 71B, 71C, and 71D, the first end surface conductor 81, the second end surface conductor 82 and the like. In addition, a coil conductor of twelve or approximately twelve turns and including a rectangular or substantially rectangular helical shape (coil conductor 10C in FIG. 19B) is defined by the second line conductors 72A and 72B, the third line conductors 73A, 73B, 73C, and 73D, the first end surface conductors 81, the second end surface conductors 82, and the like. The feeder coil 31 includes the first loop conductor 10B located in the center or substantially in the center of the coil conductor 10C in the winding axis direction of the coil conductors 10C (the first loop conductor 10B is sandwiched by the coil conductor 10C).

The two ends of the first loop conductor 10B are respectively electrically connected to the first coil antenna conductor connection terminals 91A and 91B, and the two ends of the coil conductor 10C are respectively electrically connected to the outer connection terminals 92A and 93A.

Figure 20:
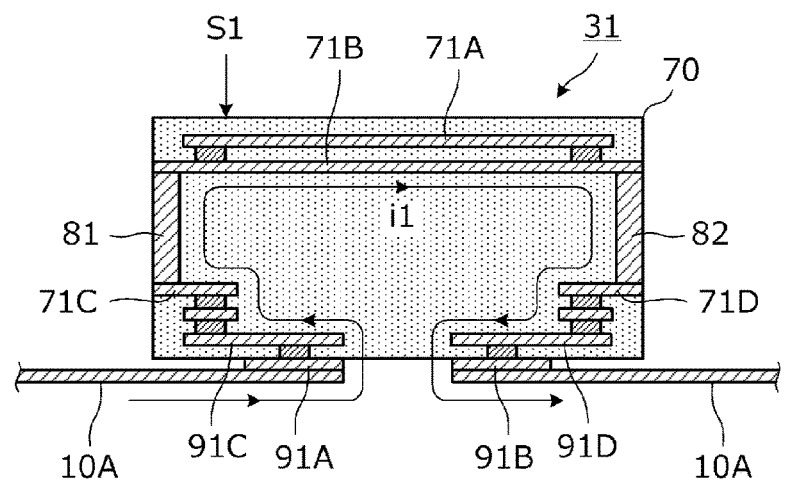
FIG. 20 is a sectional view taken along X-X in FIG. 17, and illustrates the path of a current that flows inside the feeder coil 31 when a current flows through the first coil antenna 10.

FIG. 20 is a sectional view taken along X-X in FIG. 17, and illustrates the path of a current that flows inside the feeder coil 31 when a current flows through the first coil antenna 10A. The first loop conductor is coupled with the coil conductor via an electric field, a magnetic field, or an electromagnetic field, and therefore a current flows through the first loop conductor and the first coil antenna conductor 10A when a current flows through the coil conductor of the feeder coil 31 (refer to current i1 in FIG. 20).

In the feeder coil 31 according to this preferred embodiment, the first loop conductor, which defines a portion of the first coil antenna, and the coil conductor are both provided in the multilayer body 70 (inside the feeder coil 31). The first coil antenna and the coil conductor are closer to each other in this preferred embodiment than in the case where the first loop conductor is not provided inside the feeder coil. In other words, the distance between the first coil antenna and the coil conductor is shorter. Therefore, coupling between the first coil antenna and the coil conductor is able to be stronger.

In addition, in this preferred embodiment, the winding axis of the first loop conductor substantially matches the winding axis of the coil conductor, and the aperture of the first loop conductor is superposed with apertures of the coil conductor when viewed in the winding axis direction of the coil conductor. Furthermore, the first loop conductor, which includes a number of turns of slightly less than one, is substantially superposed with the coil conductor when viewed in the winding axis direction of the coil conductor.

Since the portion where the first loop conductor and the coil conductor are close to each other is able to be longer in this preferred embodiment compared with the case where the first loop conductor is not provided inside the feeder coil, coupling between the first loop conductor and the coil conductor is able to be stronger. Therefore, coupling of the first coil antenna is able to be stronger by feeder coil 31, which is this preferred embodiment, as the feeder coil of any of the first to seventh preferred embodiments described above.

In this preferred embodiment, the number of turns of the first loop conductor is substantially one turn (slightly less than one turn). In order to increase the power that contributes to coupling with the antenna of the communication partner, it is preferable that the inductance of the first loop conductor, which contributes to coupling with the coil conductor, be sufficiently smaller than the inductance of the portion of the first coil antenna that contributes to communication. In addition, it is preferable to make the inductance of the coil conductor high in order to strengthen the coupling between the coil conductor and the first loop conductor. The inductance of the first loop conductor is preferably less than or equal to about $1/10$ of the inductance of the coil conductor, for example. Accordingly, the inductance of the first loop conductor, which does not contribute to coupling with the antenna of the communication partner, is able to be small, and the coupling between the coil conductor and the first loop conductor is able to be high. In addition, the number of turns of the first loop conductor is not limited to being substantially one turn (slightly less than one turn).

In this preferred embodiment, the first line conductors 71A and 71B, the second line conductors 72A and 72B, the third line conductors 73A, 73B, 73C, and 73D, and the first end surface conductors 81 and the second end surface conductors 82 are provided on the surfaces of the substrate layers 7d to 7n, which are magnetic bodies, and exposed. Therefore, coupling between the first loop conductor and the coil conductor is able to be strong, since there is little leakage magnetic flux, while making the inductance of the coil conductor high, and magnetic flux is able to be efficiently radiated to outside the region where the coil conductor is wound.

In addition, in the feeder coil 31, the first line conductors 71A and 71B, the second line conductors 72A and 72B, and the third line conductors 73A and 73B are respectively connected in parallel with each other. Therefore, the direct-current resistance (DCR) of the coil conductor is able to be smaller than in the case of the feeder coil 30 according to the first preferred embodiment.

As illustrated in FIG. 18 and the like, in the feeder coil 31 according to this preferred embodiment, conductor patterns that face each other with a substrate layer located therebetween include the same or substantially the same shapes, that is, similar shapes (for example, the first coil antenna conductor connection terminals 91A and 91B and the first connection conductors 91C and 91D, the outer connection terminals 92A and 93A and the outer connection conductors 92B and 93B, the first line conductor 71A and the first line conductor 71B, the second line conductors 72A and the second line conductors 72B, and the third line conductors 73A and the third line conductors 73B). In other words, in the feeder coil 31, conductor patterns that are positioned on the front and rear surfaces of each substrate layer include the same or substantially the same shapes. Accordingly, the occurrence of warping and the like caused by a difference in contraction coefficient when the material of the substrate layers and the conductor patterns are fired is able to be significantly reduced or prevented.

An example has been described for the feeder coil 31 according to this preferred embodiment in which the winding axis directions of the coil conductor and the first loop conductor substantially match each other, and the first loop conductor is substantially superposed with the coil conductor when viewed in the winding axis direction, but the feeder coil is not limited to this specific structure. Provided that the coil conductor and the first loop conductor couple with each other via an electric field, a magnetic field or an electromagnetic field due to a portion of the first coil antenna being included in the feeder coil, there is no need for the winding axis directions of the coil conductor and the first loop conductor to match each other. Similarly, so long as the coil conductor and the first loop conductor couple with each other via an electric field, a magnetic field or an electromagnetic field, there is also no need for the first loop conductor to be substantially superposed with the coil conductor when viewed in the winding axis direction.

Furthermore, although the feeder coil 31 includes the first loop conductor located in the center of the coil conductor in the winding axis direction and the first loop conductor sandwiched by the coil conductor, the preferred embodiments of the present invention are not limited to this specific structure. The first loop conductor may be located at a position other than at the center of the coil conductor in the winding axis direction.

In this preferred embodiment, an example of the feeder coil 31 has been described in which the first loop conductor, which defines a portion of the first coil antenna, and the coil conductor are included in the multilayer body 70, but the feeder coil is not limited to this specific structure. The feeder coil may instead include a second coil conductor, which defines a portion of a second coil antenna, and the coil conductor included in the multilayer body 70. That is, the coil conductor of the feeder coil may be coupled with the second coil conductor via an electric field, a magnetic field, or an electromagnetic field.

Ninth Preferred Embodiment

In a ninth preferred embodiment of the present invention, a modification of a feeder coil in which a portion of a first coil antenna is included is described.

Figure 21:
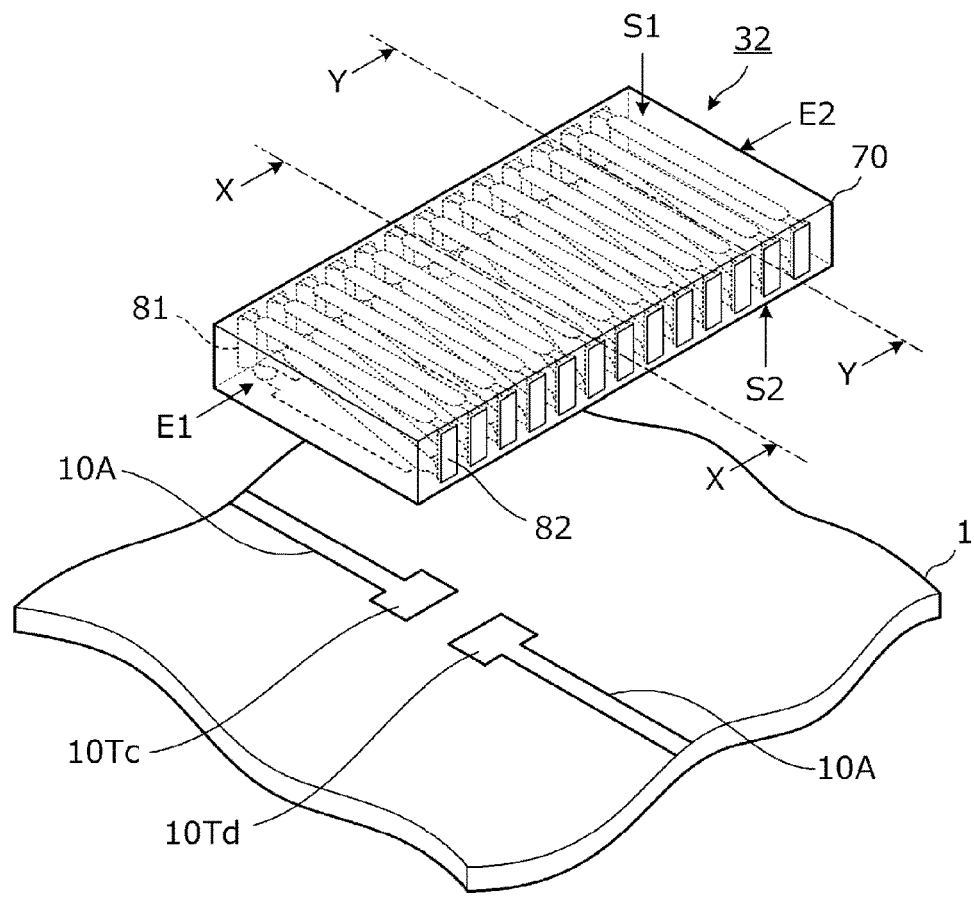
FIG. 21 is an exploded perspective view illustrating a feeder coil 32 that is mounted on a circuit board 11 in an electronic appliance according to a ninth preferred embodiment of the present invention.
Figure 22:
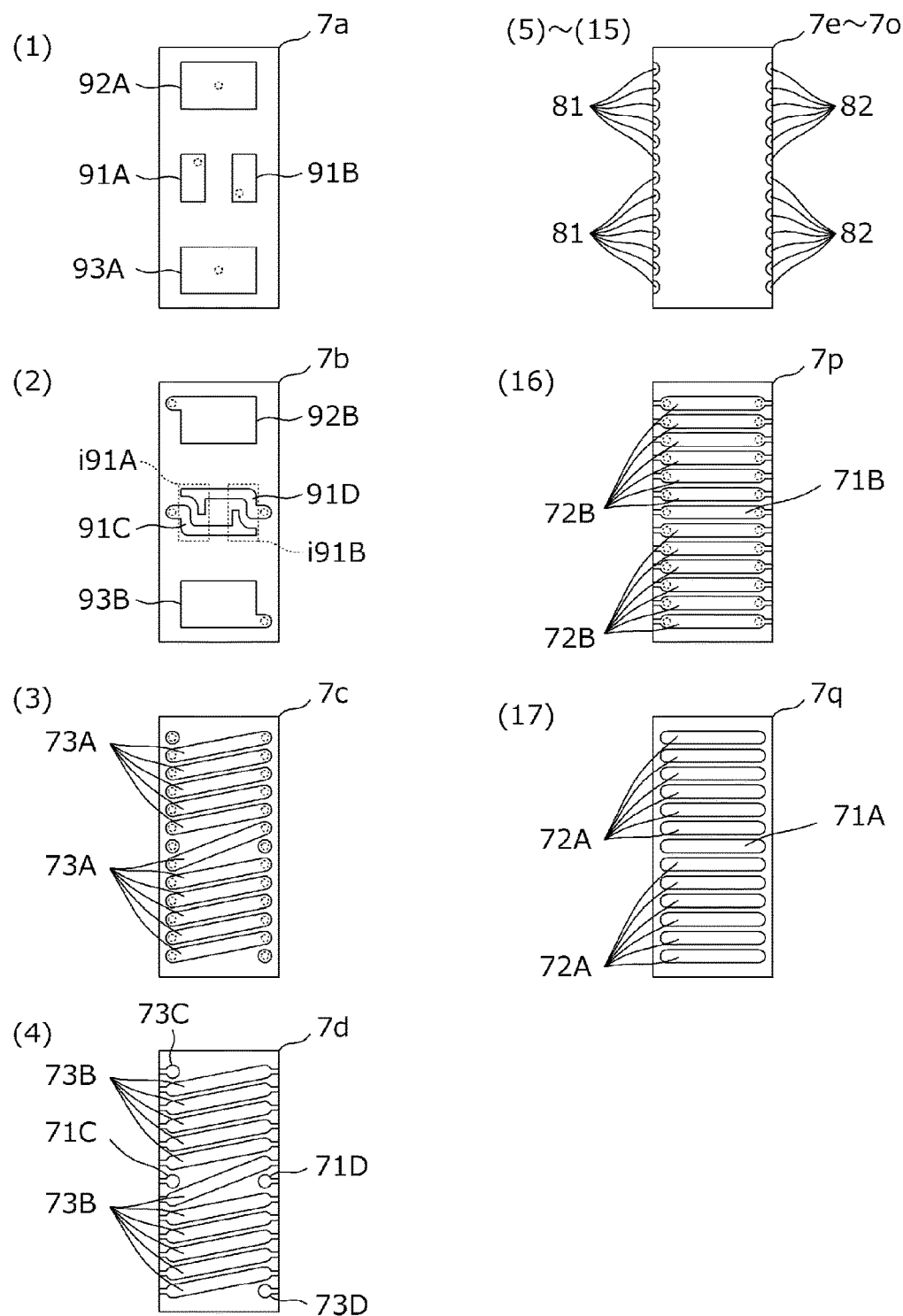
FIG. 22 is an exploded plan view illustrating electrode patterns and the like of individual substrate layers of a multilayer body 70 of the feeder coil 32.
Figure 23A:
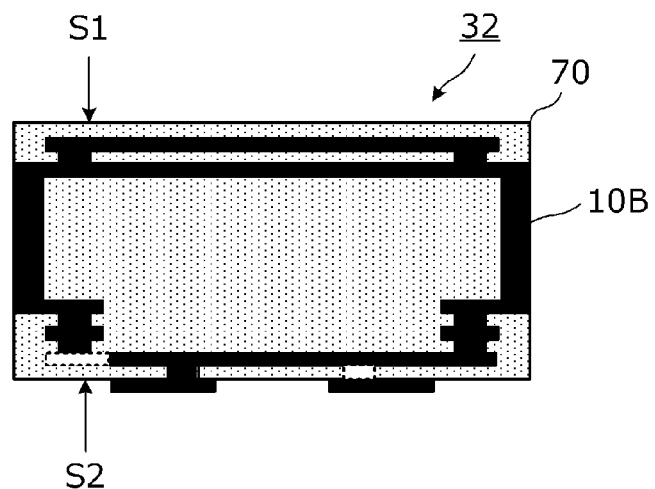
FIG. 23A is a sectional view taken along X-X in FIG. 21.
Figure 23B:
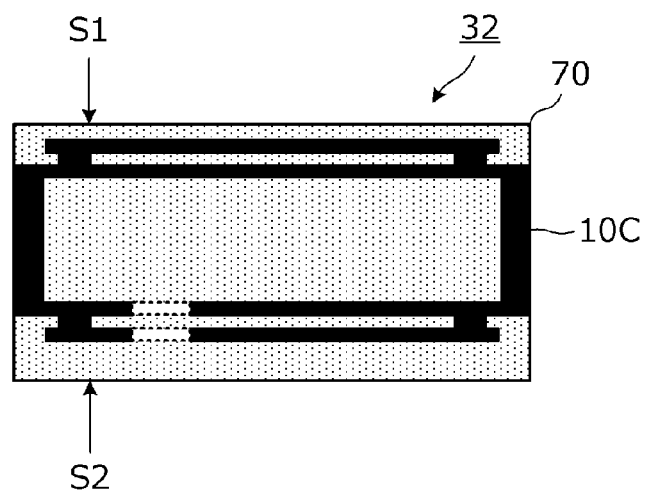
FIG. 23B is a sectional view taken along Y-Y in FIG. 21.

FIG. 21 is an exploded perspective view illustrating a feeder coil 32 that is mounted on a circuit board 11 in an electronic appliance according to the ninth preferred embodiment. FIG. 22 is an exploded plan view illustrating electrode patterns and the like of individual substrate layers of a multilayer body 70 of the feeder coil 32. FIG. 23A is a sectional view taken along X-X in FIG. 21, and FIG. 23B is a sectional view taken along Y-Y in FIG. 21. In FIG. 23A, a first loop conductor 10B is shaded black, and in FIG. 23B, a coil conductor 10C is shaded black.

The multilayer body 70 differs from the multilayer body 70 of the feeder coil 31 in terms of the shapes of the conductor patterns and the structure of interlayer connection conductors provided on a plurality of substrate layers 7a and 7b illustrated in portions (1) and (2) of FIG. 22.

Outer connection terminals 92A and 93A and first coil antenna conductor connection terminals 91A and 91B are provided on the bottom surface of the substrate layer 7a illustrated in portion (1) of FIG. 22. The outer connection terminals 92A and 93A and the first coil antenna conductor connection terminals 91A and 91B are rectangular conductor patterns.

Outer connection conductors 92B and 93B and first connection conductors 91C and 91D are provided on the bottom surface of the substrate layer 7b illustrated in portion (2) of FIG. 22. The outer connection conductors 92B and 93B are conductor patterns including rectangular or substantially rectangular shapes similar to those of the outer connection terminals 92A and 93A, and are respectively connected to the outer connection terminals 92A and 93A via interlayer connection conductors. The first connection conductors 91C and 91D are crank-shaped conductor patterns that roughly extend in a lateral direction of the substrate layer 7b. As illustrated in FIG. 22, a conductor pattern forming region i91A of the first connection conductors 91C and 91D is includes a similar shape to the first coil antenna conductor connection terminal 91A that faces the conductor pattern forming region i91A with the substrate layer 7a located therebetween. In addition, a conductor pattern forming region i91B of the first connection conductors 91C and 91D is includes a similar shape to the first coil antenna conductor connection terminal 91B that faces the conductor pattern forming region i91B with the substrate layer 7a located therebetween.

A portion of the first connection conductor 91C that is close to one end of the first connection conductor 91C is connected to the first coil antenna conductor connection terminal 91B via an interlayer connection conductor, and the other end of the first connection conductor 91C is connected to one end of a first line conductor 71C via interlayer connection conductors and so forth provided on the substrate layers 7b and 7c. A portion of the first connection conductor 91D that is close to one end of the first connection conductor 91D is connected to the first coil antenna conductor connection terminal 91A via an interlayer connection conductor, and the other end of the first connection conductor 91D is connected to one end of a first line conductor 71D via interlayer connection conductors and so forth provided on the substrate layers 7b and 7c.

A first loop conductor of substantially one turn (slightly more than one turn) and including a rectangular or substantially rectangular loop shape (refer to first loop conductor 10B in FIG. 23A) is defined by the first line conductors 71A, 71B, 71C, and 71D, a first end surface conductor 81, a second end surface conductor 82 and the like. In addition, a coil conductor of twelve or approximately twelve turns and including a rectangular or substantially rectangular helical shape (refer to coil conductor 10C in FIG. 23B) is defined by second line conductors 72A and 72B, third line conductors 73A, 73B, 73C, and 73D, first end surface conductors 81, second end surface conductors 82 and the like.

The two ends of the first loop conductor 10B are respectively electrically connected to the first coil antenna conductor connection terminals 91A and 91B, and the two ends of the coil conductor 10C are respectively electrically connected to the outer connection terminals 92A and 93A.

Figure 24:
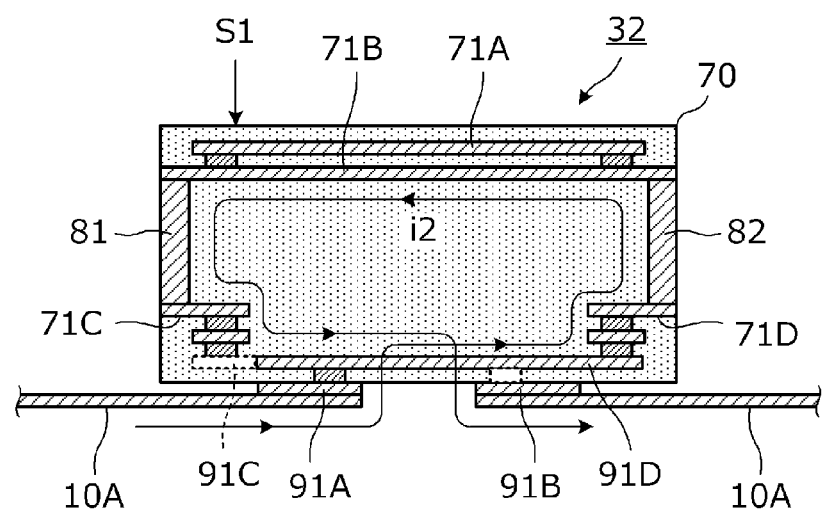
FIG. 24 is a sectional view taken along X-X in FIG. 21, and illustrates the path of a current that flows inside the feeder coil 32 when a current flows through the first coil antenna 10.

FIG. 24 is a sectional view taken along X-X in FIG. 21, and illustrates the path of a current that flows inside the feeder coil 32 when a current flows through the first coil antenna 10A. The first loop conductor is coupled with the coil conductor via an electric field, a magnetic field, or an electromagnetic field, and therefore a current flows through the first loop conductor and the first coil antenna conductor 10A when a current flows through the coil conductor 10C of the feeder coil 32 (refer to current i2 in FIG. 24).

In this preferred embodiment, the winding axis of the first loop conductor substantially matches the winding axis of the coil conductor, and the aperture of the first loop conductor is superposed with apertures of the coil conductor when viewed in the winding axis direction of the coil conductor. Furthermore, in this preferred embodiment, the first loop conductor, which includes a number of turns of slightly more than one, is substantially superposed with the coil conductor when viewed in the winding axis direction of the coil conductor. In other words, the portion of the feeder coil 32 in which the first loop conductor and the coil conductor are close to each other is longer than in the feeder coil 31 according to the eighth preferred embodiment, and therefore the coupling between the first coil antenna and the coil conductor is able to be even stronger. Therefore, coupling of the first coil antenna is able to be even stronger by feeder coil 32 of this preferred embodiment as the feeder coil of any of the first to seventh preferred embodiments described above.

In this preferred embodiment, the number of turns of the first loop conductor is substantially one turn (slightly more than one turn). In order to increase the power that contributes to coupling with the antenna of the communication partner, it is preferable that the inductance of the first loop conductor that contributes to coupling with the coil conductor be sufficiently smaller than the inductance of the portion of the first coil antenna that contributes to communication. In addition, it is preferable to make the inductance of the coil conductor high in order to strengthen the coupling between the coil conductor and the first loop conductor. The inductance of the first loop conductor is preferably less than or equal to about 1/10 of the inductance of the coil conductor, for example. Accordingly, the inductance of the first loop conductor, which does not contribute to coupling with the antenna of the communication partner, is able to be small, and the coupling between the coil conductor and the first loop conductor is able to be high. In addition, the number of turns of the first loop conductor is not limited to being substantially one turn (slightly more than one turn).

In this preferred embodiment, the first line conductors 71A and 71B, the second line conductors 72A and 72B, the third line conductors 73A, 73B, 73C, and 73D, and the first end surface conductors 81 and the second end surface conductors 82 are provided on the surfaces of the substrate layers 7d to 7n, which are magnetic bodies, are exposed. Therefore, coupling between the first loop conductor and the coil conductor is able to be strong, since there is little leakage magnetic flux, while making the inductance of the coil conductor high, and magnetic flux is able to be efficiently radiated to outside the region where the coil conductor is wound.

In addition, in the feeder coil 32, the first line conductors 71A and 71B, the second line conductors 72A and 72B, and the third line conductors 73A and 73B are respectively connected in parallel with each other. Therefore, the direct-current resistance (DCR) of the coil conductor is able to be smaller than in the case of the feeder coil 30 according to the first preferred embodiment.

As illustrated in FIG. 22 and the like, in the feeder coil 32 according to this preferred embodiment, conductor patterns that face each other with substrate layers located therebetween include the same or substantially the same shapes, that is, similar shapes (for example, the conductor pattern forming regions i91A and i91B and the first coil antenna conductor connection terminals 91A and 91B, the outer connection terminals 92A and 93A and the outer connection conductors 92B and 93B, the first line conductor 71A and the first line conductor 71B, the second line conductors 72A and the second line conductors 72B, and the third line conductors 73A and the third line conductors 73B). In other words, in the feeder coil 32, conductor patterns that are positioned on the front and rear surfaces of each substrate layer include the same or substantially the same shapes. Accordingly, the occurrence of warping and the like caused by a difference in contraction coefficient when the material of the substrate layers and the conductor patterns are fired is able to be significantly reduced or prevented. Thus, the above-described operational effect is able to be provided even in the case where a plurality of conductor patterns includes shapes that are similar to those of facing conductor patterns separated therefrom by substrate layers.

An example has been described for the feeder coil 32 according to this preferred embodiment in which the winding axis directions of the coil conductor and the first loop conductor substantially match each other, and the first loop conductor is substantially superposed with the coil conductor when viewed in the winding axis direction, but the feeder coil is not limited to this specific structure. Provided that the coil conductor and the first loop conductor couple with each other via an electric field, a magnetic field or an electromagnetic field due to a portion of the first coil antenna being included in the feeder coil, there is no need for the winding axis directions of the coil conductor and the first loop conductor to match each other. Similarly, so long as the coil conductor and the first loop conductor couple with each other via an electric field, a magnetic field or an electromagnetic field, there is also no need for the first loop conductor to be substantially superposed with the coil conductor when viewed in the winding axis direction.

Furthermore, although the feeder coil 32 includes the first loop conductor located in the center of the coil conductor in the winding axis direction and the first loop conductor sandwiched by the coil conductor, the preferred embodiments of the present invention are not limited to this specific structure. The first loop conductor may be located at a position other than at the center of the coil conductor in the winding axis direction.

In this preferred embodiment, an example of the feeder coil 32 has described in which the first loop conductor, which defines a portion of the first coil antenna, and the coil conductor are included in the multilayer body 70, but the feeder coil is not limited to this specific structure. The feeder coil may include a second coil conductor, which defines a portion of a second coil antenna, and the coil conductor included in the multilayer body 70. That is, the coil conductor of the feeder coil may be coupled with the second coil conductor via an electric field, a magnetic field, or an electromagnetic field.

Figure 25A:
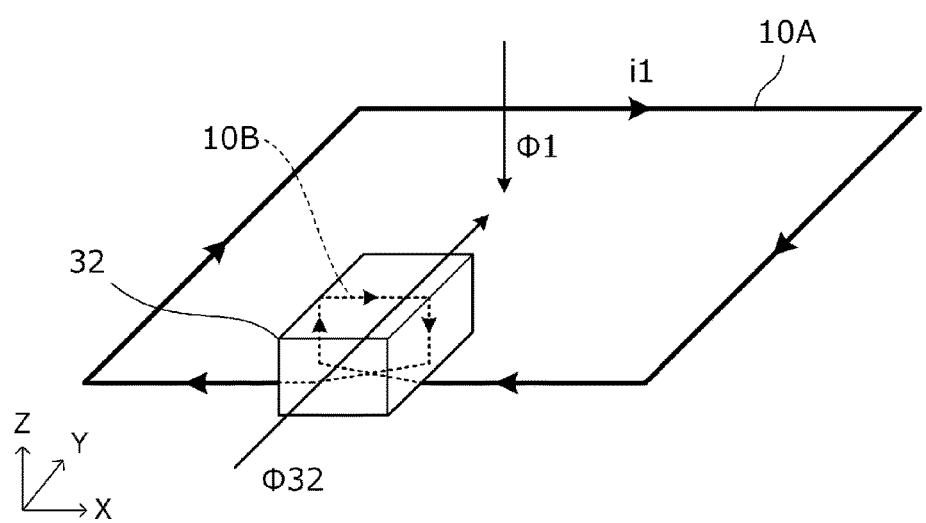
FIG. 25A is a perspective view illustrating magnetic flux generated when a current i1 flows through a first loop conductor 10B of the feeder coil 32 and a first coil antenna conductor 10A.
Figure 25B:
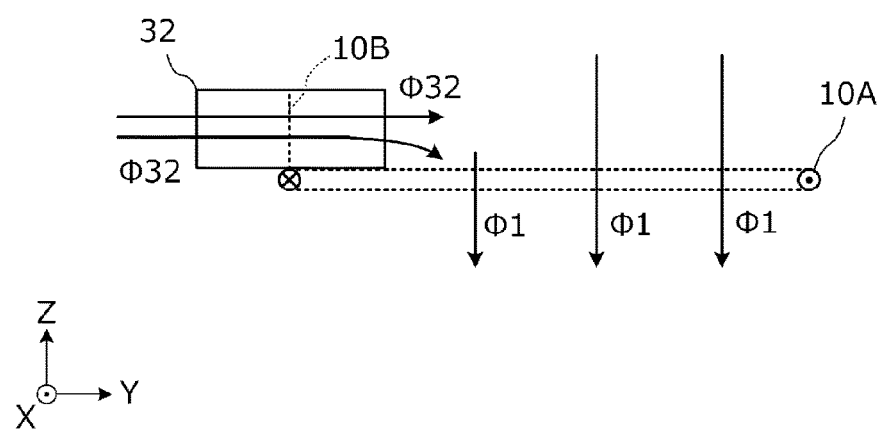
FIG. 25B is a sectional view of the magnetic flux.
Figure 26A:
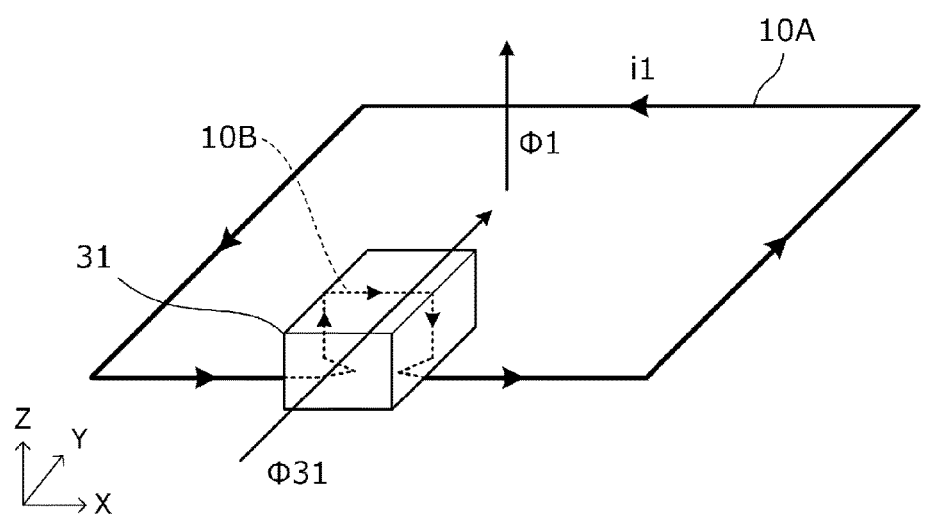
FIG. 26A is a perspective view illustrating magnetic flux generated when a current i1 flows through a first loop conductor 10B of the feeder coil 31 and a first coil antenna conductor 10A according to the eighth preferred embodiment of the present invention as a comparative example.
Figure 26B:
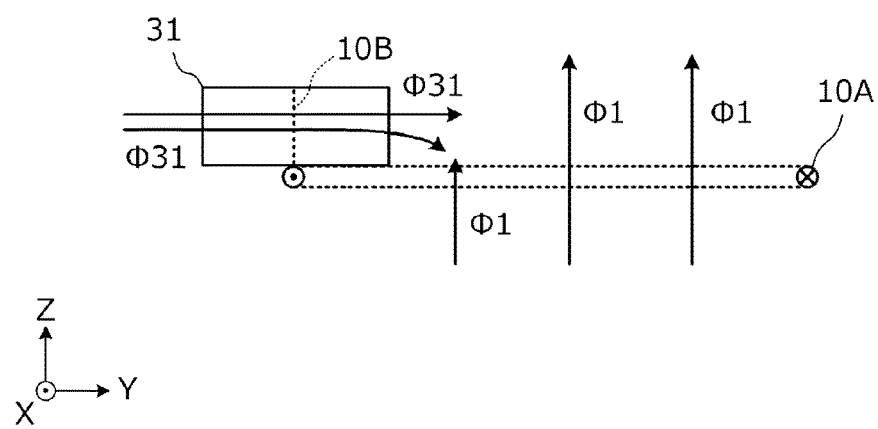
FIG. 26B is a sectional view of the magnetic flux.

Next, magnetic flux that is generated when a current flows through the first loop conductor of the feeder coil 32 according to this preferred embodiment and the first coil antenna conductor 10A is described while referring to the drawings. FIG. 25A is a perspective view illustrating magnetic flux generated when a current i1 flows through the first loop conductor 10B of the feeder coil 32 and the first coil antenna conductor 10A, and FIG. 25B is a sectional view of the magnetic flux. FIG. 26A is a perspective view illustrating magnetic flux generated when a current i1 flows through the first loop conductor 10B of the feeder coil 31, according to the eighth preferred embodiment as a comparative example, and the first coil antenna conductor 10A and FIG. 26B is a sectional view of the magnetic flux.

As illustrated in FIG. 26A, the direction (+X direction) of the current that flows through the portion of the first loop conductor 10B that is close to the top surface (upper surface of feeder coil 31) is the same or substantially the same as the direction (+X direction) of the current that flows to the first coil antenna conductor connection terminal from the first coil antenna conductor 10A when viewed from the winding axis direction of the first loop conductor 10B (Y axis direction). As illustrated in FIG. 26B, magnetic flux φ31 generated by the first loop conductor 10B is canceled out by a portion of magnetic flux φ1 generated by the first coil antenna conductor 10A.

In contrast, as illustrated in FIG. 25A, the direction (+X direction) of the current that flows through the portion of the first loop conductor 10B that is close to the top surface (upper surface of feeder coil 32) is opposite to the direction (−X direction) of the current that flows to the first coil antenna conductor connection terminal from the first coil antenna conductor 10A when viewed from the winding axis direction of the first loop conductor 10B (Y axis direction). As illustrated in FIG. 25B, magnetic flux φ32 generated by the first loop conductor 10B is not canceled out by a portion of the magnetic flux φ1 generated by the first coil antenna conductor 10A. Accordingly, the first loop conductor 10B of the feeder coil 32 and the first coil antenna conductor 10A couple with each other and strengthen each other's inductances, and therefore the efficiency of the first coil antenna as a radiating body is increased.

Tenth Preferred Embodiment

In a tenth preferred embodiment of the present invention, an example of an electronic appliance is described in which the feeder coil 31 according to the eighth preferred embodiment is included and a portion of a casing is defines and functions as the second coil antenna.

Figure 27A:
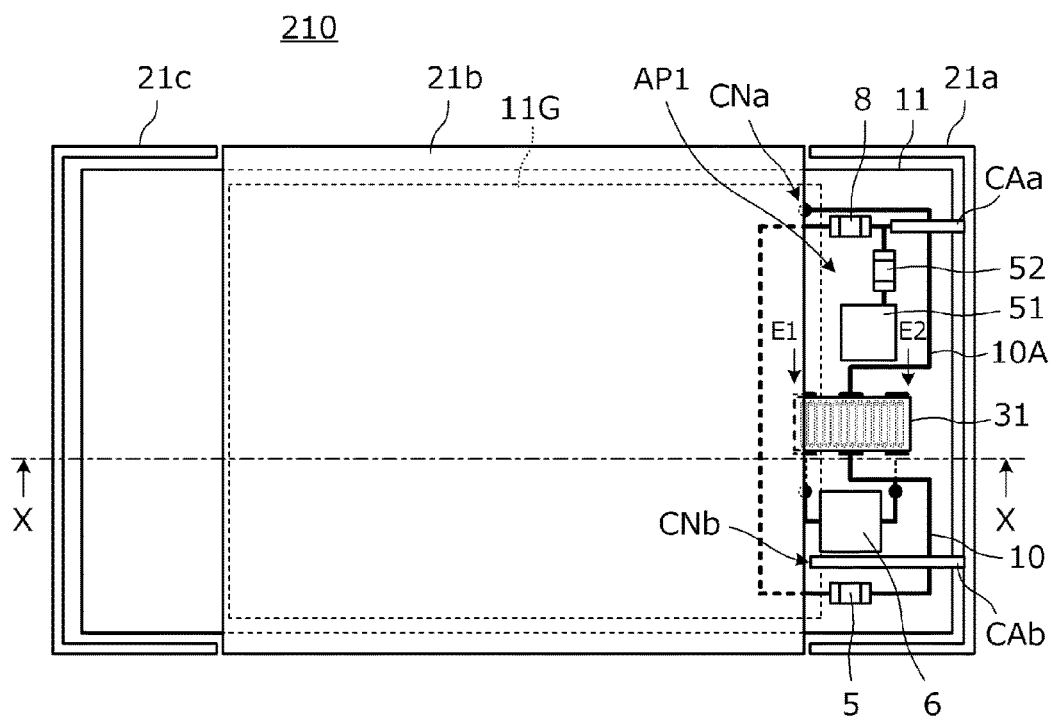
FIG. 27A is a plan view of the main portions of an electronic appliance 210 according to a tenth preferred embodiment of the present invention.
Figure 27B:
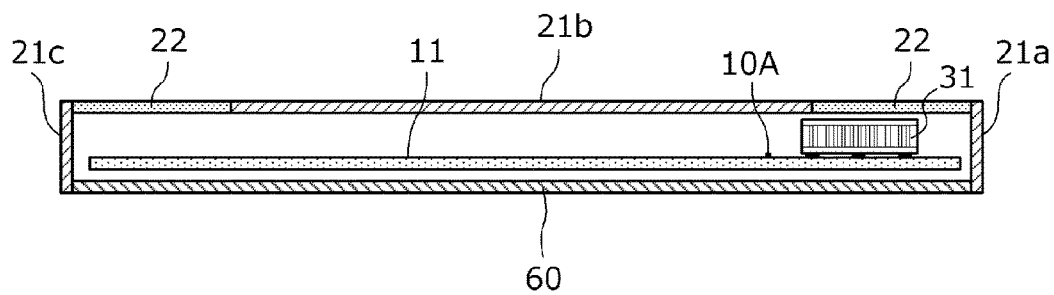
FIG. 27B is a sectional view taken along Y-Y in FIG. 27A.

FIG. 27A is a plan view of the main portions of an electronic appliance 210 according to the tenth preferred embodiment and FIG. 27B is a sectional view taken along X-X in FIG. 27A. The electronic appliance 210 differs from the electronic appliance 208 according to the seventh preferred embodiment in terms of the shape of the first coil antenna conductor 10A and the structure of the feeder coil 31. The feeder coil 31 is the same or substantially the same as the feeder coil 31 described in the eighth preferred embodiment.

The first coil antenna conductor 10A is a substantially rectangular loop shaped conductor of one or approximately one turn that is provided on a circuit board 11. Two first coil antenna conductor connection terminals are formed midway along the first coil antenna conductor 10A. The feeder coil 31 is mounted on the circuit board 11, and the two ends of the first loop conductor of the feeder coil 31 are respectively connected to the two first coil antenna conductor connection terminals. That is, the first loop conductor of the feeder coil 31 is directly connected to a point midway along the first coil antenna conductor 10A. Accordingly, the feeder coil 31 is coupled with the first coil antenna 10 (coil antenna including the first loop conductor and the first coil antenna conductor 10A) via an electric field, a magnetic field or an electromagnetic field.

In addition, the first coil aperture E1 of the feeder coil 31 is positioned inside the coil aperture AP1 of the first coil antenna 10, and the second coil aperture E2 of the feeder coil 31 is positioned outside the coil aperture AP1 of the first coil antenna 10. Therefore, the feeder coil 31 is magnetic-field coupled with the first coil antenna 10.

In the electronic appliance 210 according to this preferred embodiment, an example has been described in which the first coil antenna conductor 10A is a substantially rectangular loop shaped conductor of one or approximately one turn, but the preferred embodiments of the present invention are not limited to this specific structure. The number of turns (turn number) of the first coil antenna conductor 10A is able to be changed as appropriate within the range in which the operational effect of the preferred embodiments of the present invention are provided.

Eleventh Preferred Embodiment

In an eleventh preferred embodiment of the present invention, an example of an antenna device is described in which a feeder coil is mainly coupled with a first coil antenna.

Figure 28:
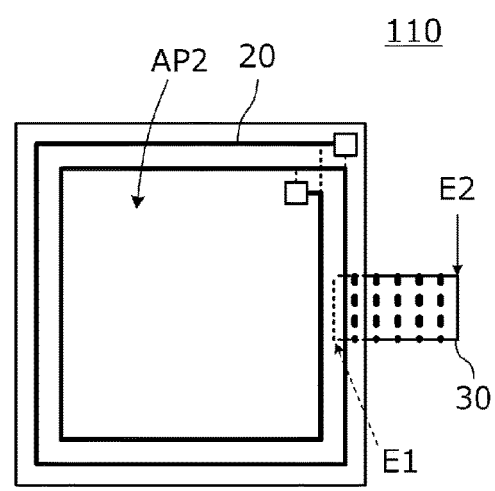
FIG. 28 is a plan view of an antenna device 110 according to the tenth preferred embodiment of the present invention.
Figure 29:
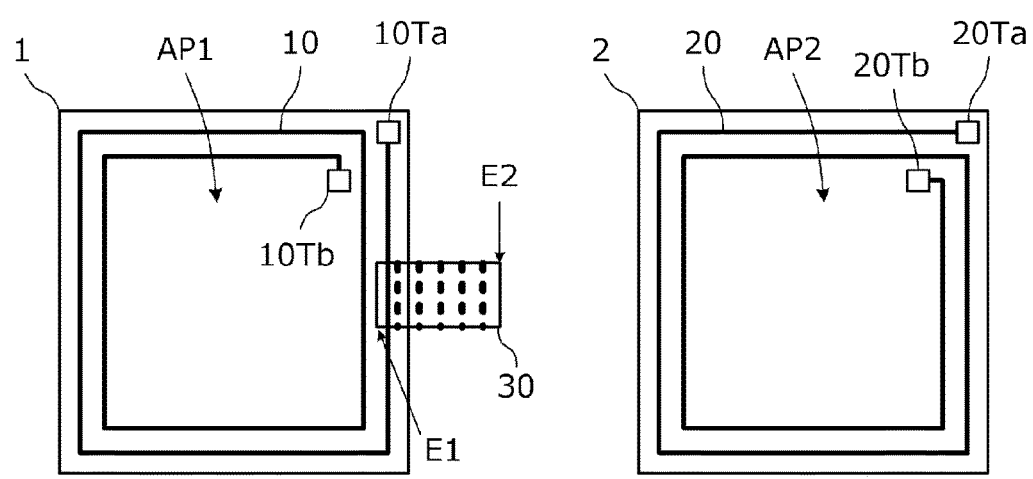
FIG. 29 is a plan view in which a first coil antenna 10 and a second coil antenna 20 of the antenna device 110 are illustrated in a separated manner.
Figure 30:
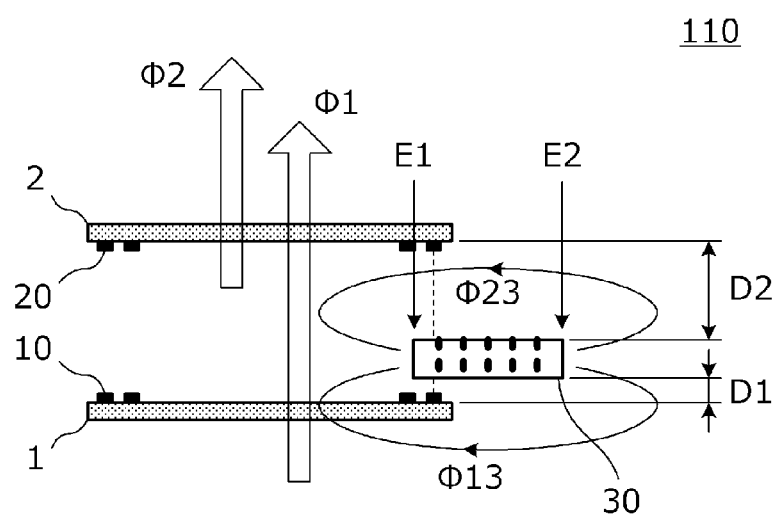
FIG. 30 is a front view of the antenna device 110.

FIG. 28 is a plan view of an antenna device 110 according to the eleventh preferred embodiment. FIG. 29 is a plan view in which a first coil antenna 10 and a second coil antenna 20 of the antenna device 110 are illustrated in a separated manner. FIG. 30 is a front view of the antenna device 110.

The antenna device 110 includes the first coil antenna 10, the second coil antenna 20, and a feeder coil 30. The first coil antenna is a rectangular-spiral coil that is provided on a substrate 1, and the second coil antenna 20 is a rectangular-spiral coil that is provided on a substrate 2. The winding axis directions of first coil antenna and the second coil antenna 20 are parallel or substantially parallel to each other (i.e., the same or substantially the same direction).

The feeder coil 30 is the same or substantially the same as the feeder coil 30 described in the first preferred embodiment. The feeder coil 30 includes a winding axis that extends in a direction perpendicular or substantially perpendicular to the winding axis of the first coil antenna 10, and includes a first coil aperture E1 and a second coil aperture E2. The feeder coil 30 is located between the first coil antenna 10 and the second coil antenna 20 in the height direction (winding axis direction of first coil antenna 10 and second coil antenna 20).

The first coil aperture E1 is closer to a coil aperture AP1 of the first coil antenna 10 than the second coil aperture E2 in a plan view along the winding axis direction of the first coil antenna 10. In addition, the first coil aperture E1 is closer to the first coil antenna 10 than to the second coil antenna 20 in the winding axis direction of the first coil antenna 10 (D1<D2 in FIG. 30).

A region in which the coil aperture of the first coil antenna 10 and a region in which the coil aperture of the second coil antenna 20 is included are substantially superposed with each other in a plan view along the winding axis direction of the first coil antenna 10.

Two ends 10Ta and 10Tb of the first coil antenna 10 are respectively connected to two ends 20Ta and 20Tb of the second coil antenna 20. In this way, the first coil antenna 10 and the second coil antenna 20 are connected in parallel with each other. In this parallel connected state, the first coil antenna 10 and the second coil antenna 20 are connected to each other in a polarity such that the magnetic fluxes thereof with respect to the winding axis direction of the first coil antenna 10 are in phase with each other.

As described above, since the first coil aperture E1 is closer to the first coil antenna 10 than to the second coil antenna 20 in the winding axis direction of the first coil antenna 10, the feeder coil 30 and the first coil antenna 10 are magnetic-field coupled with each other via magnetic flux φ13. In contrast, it is more difficult for the feeder coil 30 and the second coil antenna 20 to magnetic field couple with each other than for the feeder coil 30 and the first coil antenna 10. The directions of the magnetic fluxes φ1 and φ13 that pass through the first coil antenna 10 and the direction of the magnetic flux φ2 that passes through the second coil antenna 20 are identical.

According to this preferred embodiment, the surface area in plan view is able to be smaller and a small-size antenna device is able to be provided. In addition, by stacking the first coil antenna 10 and the second coil antenna 20 on top of one another, the first coil antenna 10 and the second coil antenna 20 couple with each other and strengthen each other's inductances, and therefore the efficiencies of the coil antennas as radiating bodies are increased.

In this preferred embodiment, an example has been described in which a region in which the coil aperture of the first coil antenna 10 is provided and a region in which the coil aperture of the second coil antenna 20 is provided are substantially superposed with each other in a plan view along the winding axis direction of the first coil antenna 10, but the preferred embodiments of the present invention are not limited to this specific structure. It is sufficient that the region in which the coil aperture of the first coil antenna 10 is provided and the region in which the coil aperture of the second coil antenna 20 is provided be at least partially superposed with each other in a plan view along the winding axis direction of the first coil antenna 10.

Furthermore, in this preferred embodiment, the first coil aperture E1 is closer to both the coil aperture AP1 of the first coil antenna 10 and the coil aperture AP2 of the second coil antenna 20 than the second coil aperture E2 in a plan view along the winding axis direction of the first coil antenna 10, but the preferred embodiments of the present invention are not limited to this specific structure. The first coil aperture E1 being closer to the coil aperture AP2 of the second coil antenna 20 than the second coil aperture E2 is not an essential feature of antenna devices of the preferred embodiments of the present invention.

Twelfth Preferred Embodiment

In a twelfth preferred embodiment of the present invention, an example of an electronic appliance is described that includes the antenna device described in the eleventh preferred embodiment and in which a portion of a casing is implemented as a second coil antenna, and an example of an electronic appliance is described in which a portion of a casing is implemented as the antenna of another communication system.

Figure 31A:
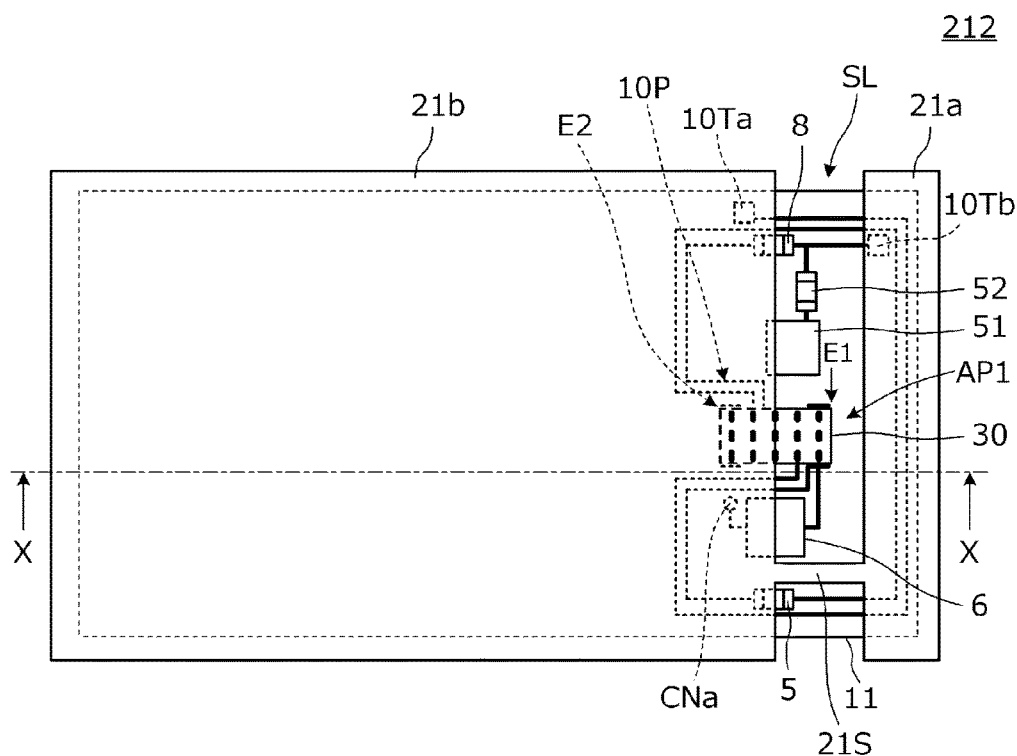
FIG. 31A is a plan view of the main portions of an electronic appliance 212 according to a twelfth preferred embodiment of the present invention.
Figure 31B:
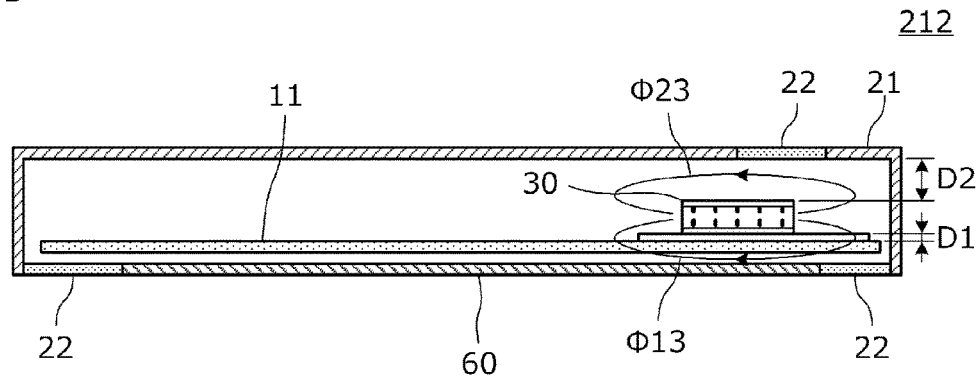
FIG. 31B is a sectional view taken along X-X in FIG. 31A.

FIG. 31A is a plan view of the main portions of an electronic appliance 212 according to the twelfth preferred embodiment, and FIG. 31B is a sectional view taken along X-X in FIG. 31A. The electronic appliance 212 is a mobile electronic appliance, for example, a smart phone, and includes metal casings 21a and 21b located on the opposite side from a surface where a display 60 is located. That is, the metal casings 21a and 21b are electrically conductive casings. The metal casings 21a and 21b are connected to each other at a prescribed position by a stub 21S. A gap between the metal casings 21a and 21b defines a slit SL. A casing resin portion 22 is provided in (closes) the slit SL. A circuit board 11 is provided inside the metal casing 21. The first coil antenna 10 is provided on a front surface of the circuit board 11. In addition, the feeder coil 30, chip capacitors 5 and 52, a chip inductor 8, and RFICs 6 and 51 are mounted on the circuit board 11. A resonance chip capacitor, a filter circuit, a matching network and the like may be connected between the feeder coil 30 and the RFIC 6.

The chip capacitor 5 and the chip inductor 8 are serially connected at points midway along the first coil antenna 10. The first end 10Ta and the second end 10Tb of the first coil antenna 10 respectively contact two sides, which are separated by the slit SL, of the metal casing 21 via movable probe pins (not illustrated). Therefore, a current path that is provided by inner edges of the slit SL defined by the metal casings 21a and 21b and the stub 21S, and the movable probe pins define and function as a second coil antenna. The first coil antenna 10 is electrically connected to the second coil antenna. An LC resonance circuit is defined by inductance components and capacitance components included in a series connection circuit consisting of the first coil antenna 10, the second coil antenna, the chip capacitor 5, and the chip inductor 8. The resonant frequency of this LC resonance circuit is equal to or substantially equal to the NFC communication carrier frequency. Alternatively, the resonant frequency is close to the NFC communication carrier frequency.

The first coil antenna 10 and the second coil antenna 20 are connected to each other in a polarity such that the magnetic fluxes thereof with respect to the winding axis direction of the first coil antenna 10 are in phase with each other.

The first coil antenna 10 includes a modified-shape portion 10P where the first coil antenna 10 extends in a direction from the second coil aperture E2 toward the first coil aperture E1 in a plan view along the winding axis direction of the first coil antenna 10. The first coil aperture E1 of the feeder coil 30 is positioned inside the coil aperture AP1 of the first coil antenna 10, and the second coil aperture E2 of the feeder coil 30 is positioned outside the coil aperture AP1 of the first coil antenna 10. In other words, the first coil aperture E1 is closer to the coil aperture AP1 of the first coil antenna 10 than the second coil aperture E2 in a plan view along the winding axis direction of the first coil antenna 10.

In addition, the first coil aperture E1 is closer to the first coil antenna 10 than to the second coil antenna 20 in the winding axis direction of the first coil antenna 10 (distance D1<than distance D2 in FIG. 31B). Therefore, the feeder coil 30 more readily magnetic-field couples with the first coil antenna 10 than with the second coil antenna, and the direction of the magnetic flux that passes through the first coil antenna 10 and the direction of the magnetic flux that passes through the second coil antenna are identical.

A region in which the coil aperture of the first coil antenna 10 is provided and a region in which the slit SL, which corresponds to the coil aperture of the second coil antenna, is provided are partially superposed with each other in a plan view along the winding axis direction of the first coil antenna 10. Therefore, by stacking the first coil antenna 10 and the second coil antenna on top of one another, the first coil antenna 10 and the second coil antenna couple with each other and strengthen each other's inductances, and therefore the efficiencies of the coil antennas as radiating bodies are increased.

According to this preferred embodiment, since a portion of a metal casing is implemented as a coil antenna, an electronic appliance is able to be provided that is equipped with a coil antenna while also being covered by a metal casing.

An inverted F antenna is defined by the metal casings 21a and 21b and the stub 21S. The RFIC 51 is an IC for long-range wireless communication (far-field communication) other than NFC, for example, cellular communication, a wireless LAN, Bluetooth (registered trademark) or GPS. The carrier frequencies of these long-range wireless communication systems are higher than the carrier frequency of NFC. The RFIC 51 feeds power to the inverted F antenna via the chip capacitor 52. The impedance of the chip inductor 8 is high and the chip inductor 8 is in an equivalently open state at the communication frequency upon which the RFIC 51 operates. Therefore, the inverted F antenna functions as an antenna for long-range wireless communication (far-field communication) independently of the first coil antenna 10 and the second coil antenna.

A filter or a switch, for example, a low pass filter that blocks a communication frequency band of cellular communication or the like, may be provided instead of the chip inductor 8. In addition, the chip inductor 8 may contribute to resonance at the NFC communication frequency. In addition, a filter or a switch, for example, a high pass filter that blocks the NFC communication frequency band, may be provided instead of the chip capacitor 52. In addition, a filter or a matching network may be provided in a stage subsequent to the RFIC 51 (antenna side).

In addition, in this preferred embodiment, the first coil antenna 10 includes a greater number of turns than the second coil antenna. Therefore, the coupling coefficient between the feeder coil 30 and the first coil antenna 10 is able to be increased while significantly reducing or preventing coupling between the feeder coil 30 and the second coil antenna.

A radiating element that radiates electromagnetic waves a long distance (far field) and a radiating element of a standing wave antenna are examples of the inverted F antenna, as described in the sixth preferred embodiment.

Furthermore, in this preferred embodiment, an example has been described in which the second coil antenna is a radiating element that radiates electromagnetic waves in a far field, and in which the first coil antenna 10 and the second coil antenna are radiating elements that radiate magnetic fields in a near field, but the preferred embodiments of the present invention are not limited to this specific structure. It is sufficient that either of the first coil antenna 10 and the second coil antenna defines at least a portion of a radiating element that radiates electromagnetic waves in a far field, and that the first coil antenna 10 and the second coil antenna define at least a portion of a radiating element that radiates a magnetic field in a near field. In addition, the first coil antenna 10 may define at least a portion of the radiating element of a standing wave antenna.

Thirteenth Preferred Embodiment

In a thirteenth preferred embodiment of the present invention, an example of an electronic appliance is described in which the positional relationship between the second coil antenna and the feeder coil differs from that in the twelfth preferred embodiment.

Figure 32A:
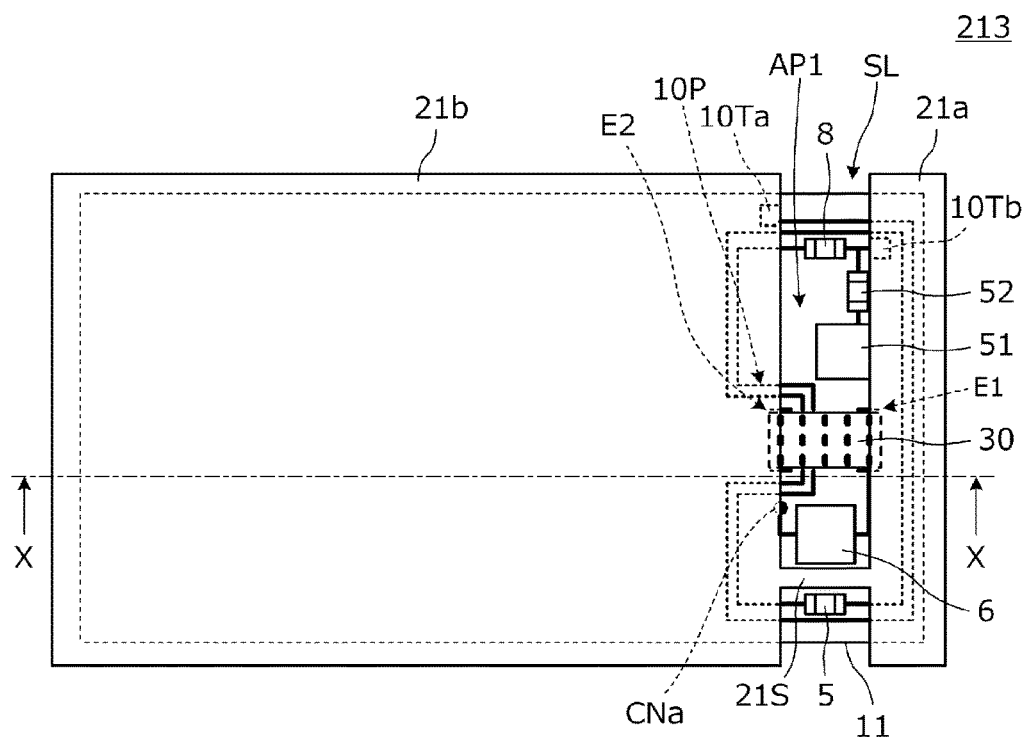
FIG. 32A is a plan view of the main portions of an electronic appliance 213 according to a thirteenth preferred embodiment of the present invention and FIG. 32B is a sectional view taken along X-X in FIG. 32A.
Figure 32B:
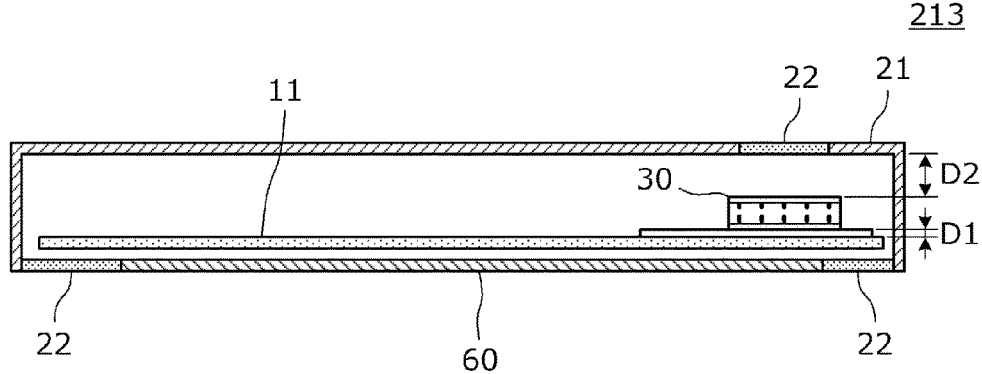

FIG. 32A is a plan view of the main portions of an electronic appliance 213 according to the thirteenth preferred embodiment, and FIG. 32B is a sectional view taken along X-X in FIG. 32A. The electronic appliance 213 according to this preferred embodiment includes the same or substantially the same components and elements as the electronic appliance 212 according to the twelfth preferred embodiment except for the positional relationship between the second coil antenna and the feeder coil 30. Hereafter, only portions that are different from the electronic appliance 212 are described.

A region in which the feeder coil 30 is provided is superposed with conductor portions of the second coil antenna (metal casings 21a and 21b), and the first coil aperture E1 and the second coil aperture E2 are positioned outside the slit SL, which corresponds to the coil aperture of the second coil antenna, in a plan view along the winding axis direction of the second coil antenna. Therefore, the magnetic flux that passes through the feeder coil 30 interlinks with the coil aperture AP1 of the first coil antenna 10, and the feeder coil 30 magnetic-field couples with the first coil antenna 10. On the other hand, the magnetic flux that passes through the feeder coil 30 does not interlink with the slit SL that corresponds to the coil aperture of the second coil antenna, and therefore the feeder coil 30 and the second coil antenna substantially do not magnetic-field couple with each other.

In addition, the feeder coil 30 (first coil aperture E1) is closer to the first coil antenna 10 than to the second coil antenna 20 in the winding axis direction of the first coil antenna (distance D1<than distance D2 in FIG. 32B). Therefore, in this preferred embodiment as well, the feeder coil 30 more readily magnetic-field couples with the first coil antenna 10 than with the second coil antenna.

In addition, in this preferred embodiment, an example has been described in which the region in which the feeder coil 30 is provided is superposed with the conductor portions of the second coil antenna (metal casings 21a and 21b) in a plan view along the winding axis direction of the second coil antenna, but the preferred embodiments of the present invention are not limited to this specific structure. In the case where the second coil antenna is a coil, the region in which the feeder coil 30 may be provided is superposed with the coil conductor of the second coil antenna.

In addition, in this preferred embodiment, an example has been described in which the first coil aperture E1 and the second coil aperture E2 are positioned outside the coil aperture of the second coil antenna, but the preferred embodiments of the present invention are not limited to this specific structure. A similar effect is provided even if the first coil aperture E1 and the second coil aperture E2 are superposed with the coil aperture of the second coil antenna.

Other Preferred Embodiments

Finally, the descriptions of the above preferred embodiments are illustrative in all points and are not restrictive. A person skilled in the art is able to modify or change the preferred embodiments as appropriate. For example, portions of the components and elements described in different preferred embodiments are able to be substituted for one another or combined with each other. The scope of the present invention is defined by the following claims rather than by the above-described preferred embodiments. In addition, it is intended that equivalents to the scope of the claims and all modifications that are within the scope of the claims be included within the scope of the present invention.

For example, the winding axis directions of the first coil antenna 10 and second coil antenna 20 are not required to be completely parallel, and it is sufficient that the winding axis directions be non-perpendicular. However, it is preferable that the winding axis directions be substantially identical.

In the above-described preferred embodiments, examples have been described in which the RFIC is directly connected to the feeder coil, but a filter, a matching network, a resonance element or the like may instead be connected in a stage subsequent to the RFIC (antenna side).

In the sixth preferred embodiment, the seventh preferred embodiment, and the tenth preferred embodiment, a case is described in which at least a portion of the second coil antenna is defined by at least a portion of a long-distance wireless communication (far-field communication) radiating element and a metal casing, but at least a portion of the first coil antenna may instead be defined by a long-distance wireless communication (far-field communication) radiating element. In addition, a portion of the first coil antenna may include at least a portion of a metal casing. Furthermore, although at least a portion of the first coil antenna or the second coil antenna is defined by at least a portion of a metal casing, this portion need not define and function as a long-distance wireless communication (far-field communication) radiating element. In addition, at least a portion of the first coil antenna or the second coil antenna may instead be defined by at least a portion of long-distance wireless communication (far-field communication) radiating element rather than a metal casing. Furthermore, rather than the first coil antenna or the second coil antenna including at least a portion of a metal casing, the first coil antenna or the second coil antenna may instead include a casing formed of graphite or the like that is conductive. In addition, the first coil antenna or the second coil antenna may instead include a conductive member, for example, a shield member, a battery pack, a heat-radiating graphite sheet, a ground conductor, or the like mounted on an electronic appliance.

The feeder coils 30, 31, and 32 described above are not only able to be applied to magnetic-field coupling between the first coil antenna 10 and the second coil antenna 20. The feeder coils 30, 31, and 32 may define and function as coil antennas that magnetic-field couple with the antenna of a communication partner similarly to the first coil antenna 10 and the second coil antenna 20.

In the above-described preferred embodiments, antenna devices and electronic appliances of a communication system in which magnetic field coupling, for example, NFC, is utilized have mainly been described, but the antenna devices and electronic appliances according to the preferred embodiments described above are able to be similarly applied to non-contact power transmission systems that use magnetic field coupling (electromagnetic induction method or magnetic field resonance method). In other words, the antenna device of each preferred embodiment is able to also be applied as a power transmission antenna device of a power transmission device or a power reception antenna device of a power reception device of a non-contact power transmission system. In this case as well, the antenna device is able to define and function as a power transmission antenna device or a power reception antenna device, and coupling between the feeder coil and both the first coil antenna and the second coil antenna is able to be strengthened.

In the preferred embodiments, examples have been described in which components mounted on a circuit board or the like are chip components, for example, a chip capacitor, a chip inductor, and the like, but the preferred embodiments of the present invention are not limited to this specific structure. For example, components may be lead-terminal components or elements provided on a flexible substrate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A coil antenna comprising:
  an insulating body;
  a coil conductor that is connected to an external feeder circuit, is included in the insulating body, and includes a winding axis; and
  a first loop conductor that is included in the insulating body, includes a winding axis, and is not electrically connected to the coil conductor; wherein
  the winding axis of the first loop conductor and the winding axis of the coil conductor match or substantially match each other;
  at least a portion of an aperture of the first loop conductor is superposed with an aperture of the coil conductor when viewed in a winding axis direction of the coil conductor; and
  a number of turns of the first loop conductor is one or substantially one, or the first loop conductor includes an inductance that is less than or equal to about $1/10$ of an inductance of the coil conductor.

2. The coil antenna according to claim 1, wherein the insulating body is a multilayer body that includes a magnetic layer.

3. The coil antenna according to claim 1, further comprising:
  a plurality of connection terminals; wherein
  the plurality of connection terminals includes two outer connection terminals that are respectively electrically connected to two ends of the coil conductor and two first coil antenna conductor connection terminals that are respectively electrically connected to two ends of the first loop conductor.

4. The coil antenna according to claim 1, wherein the coil antenna performs communication with a communication partner by magnetic-field coupling.

5. An antenna device comprising:
  a first coil antenna conductor; and
  a feeder coil; wherein
  the feeder coil includes:
    a multilayer body including a magnetic layer,
    a coil conductor that is connected to an external feeder circuit, is included in the insulating body, and includes a winding axis; and
    a first loop conductor that is included in the insulating body, includes a winding axis, and is not electrically connected to the coil conductor;
  the winding axis of the first loop conductor and the winding axis of the coil conductor match or substantially match each other;
  at least a portion of an aperture of the first loop conductor is superposed with an aperture of the coil conductor when viewed in a winding axis direction of the coil conductor;
  a number of turns of the first loop conductor is one or substantially one, or the first loop conductor includes an inductance that is less than or equal to about $1/10$ of an inductance of the coil conductor; and
  the first coil antenna conductor and the first loop conductor are connected to each other and define a single coil antenna.

6. The antenna device according to claim 5, wherein the insulating body is a multilayer body that includes a magnetic layer.

7. The antenna device according to claim 5, further comprising:
  a plurality of connection terminals; wherein
  the plurality of connection terminals includes two outer connection terminals that are respectively electrically connected to two ends of the coil conductor and two first coil antenna conductor connection terminals that are respectively electrically connected to two ends of the first loop conductor.

8. The antenna device according to claim 7, wherein a direction of a current that flows through the first loop conductor close to a top surface of the multilayer body that faces a bottom surface of the multilayer body is opposite to a direction of a current that flows to the first coil antenna conductor connection terminal from the first coil antenna conductor when viewed in a winding axis direction of the first loop conductor.

9. The antenna device according to claim 5, wherein the first loop conductor is located in or substantially in a center of the coil conductor in the winding direction.

* * * * *